(12) United States Patent
Morinaga et al.

(10) Patent No.: US 9,467,946 B2
(45) Date of Patent: Oct. 11, 2016

(54) PORTABLE TERMINAL, TRANSITION METHOD, AND PROGRAM

(71) Applicant: NTT DOCOMO, INC., Tokyo (JP)

(72) Inventors: Yasuo Morinaga, Tokyo (JP); Masashi Tagaya, Tokyo (JP); Masakatsu Tsukamoto, Tokyo (JP); Sadanori Aoyagi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/429,937

(22) PCT Filed: Oct. 3, 2013

(86) PCT No.: PCT/JP2013/076952
§ 371 (c)(1),
(2) Date: Mar. 20, 2015

(87) PCT Pub. No.: WO2014/054738
PCT Pub. Date: Apr. 10, 2014

(65) Prior Publication Data
US 2015/0245297 A1 Aug. 27, 2015

(30) Foreign Application Priority Data
Oct. 3, 2012 (JP) ................................ 2012-221376

(51) Int. Cl.
*H04M 1/00* (2006.01)
*H04W 52/02* (2009.01)
(Continued)

(52) U.S. Cl.
CPC ........ *H04W 52/0254* (2013.01); *G06F 1/1626* (2013.01); *G06F 1/1643* (2013.01); *G06F 1/1694* (2013.01); *G06F 1/3215* (2013.01); *G06F 1/3262* (2013.01); *G06F 1/3265* (2013.01); *G06F 2200/1637* (2013.01); *H04M 2250/12* (2013.01); *Y02B 60/1242* (2013.01); *Y02B 60/50* (2013.01)

(58) Field of Classification Search
None
See application file for complete search history.

(56) References Cited

U.S. PATENT DOCUMENTS

2007/0075965 A1* 4/2007 Huppi ............... H04M 1/72563
345/156

FOREIGN PATENT DOCUMENTS

| JP | 2007-128266 A | 5/2007 |
| JP | 2010-219707 A | 9/2010 |
| JP | 2010-507870 A | 11/2010 |

(Continued)

OTHER PUBLICATIONS

PCT International Search Report issued in International Application No. PCT/JP2013/076952, date mailed Jan. 14, 2014, pp. 1-2.

(Continued)

*Primary Examiner* — Adolf Dsouza
(74) *Attorney, Agent, or Firm* — MKG LLC

(57) ABSTRACT

A portable terminal includes a first detection unit that detects a change in a position of the portable terminal; a second detection unit that detects a change in a physical quantity representing a surrounding condition of the portable terminal; and a transition unit that causes the portable terminal to transition from a first state to a second state in which electricity consumption is smaller than that of the first state, when a relation between a direction of the change detected by the first detection unit and a trend in the change in the physical quantity detected by the second detection unit satisfies a predetermined condition.

9 Claims, 18 Drawing Sheets

(51) Int. Cl.
*G06F 1/16* (2006.01)
*G06F 1/32* (2006.01)

(56) References Cited

FOREIGN PATENT DOCUMENTS

JP 2011-133976 A 7/2011

JP 2011133976 A 7/2011

OTHER PUBLICATIONS

Notice of Reasons for Rejection for Japanese Patent Application No. 2012-221376, dated Jan. 27, 2015.
Extended European Search Report issued in corresponding European Patent Application No. 13843500.3 dated Apr. 28, 2016.

* cited by examiner

PORTABLE TERMINAL, TRANSITION METHOD, AND PROGRAM

TECHNICAL FIELD

The present invention relates to a technique for switching an operation state of a portable terminal when it is determined that the terminal is stored.

BACKGROUND ART

To reduce electricity consumption, some portable terminals, such as mobile telephones or smartphones, have a function of switching a state of the portable terminals from a state in which a large amount of electric power is consumed, to another state, in which a small amount of electric power is consumed. For example, the state in which a small amount of electric power is consumed refers to a state in which no operation is received from a user. JP2011-133976 discloses a technique for detecting an area of a region, in which no light is detected, on a display screen based on a result of detection by an optical sensor that is disposed at each pixel of the display surface serving as an operation surface, and for setting a key input to invalid (namely, switching to a state in which no operation can be received) when an area greater than a predetermined area is detected.

In the technique disclosed in JP2011-133976, even if a portable terminal is not stored in a storage space, it is determined that the portable terminal is stored in the storage space to transition a state of the portable terminal; for example, when the portable terminal is used in a building, in which lights are turned off, or is used on a dark street at night, and when no light is detected on an area of a region of a display screen that exceeds a predetermined area, a similar determination is made to that in a case where the portable terminal is stored in a storage space. It can thus be said that the technique disclosed in JP2011-133976 has low accuracy in determining whether the portable terminal is stored.

SUMMARY

In response, it is an object of the present invention to increase accuracy in determining in a portable terminal whether the portable terminal is stored, for transitioning a state of the portable terminal when it is determined that the portable terminal is stored.

In one embodiment of the present invention, there is provided a portable terminal including: a first detection unit that detects a change in a position of the portable terminal; a second detection unit that detects a change in a physical quantity representing a surrounding condition of the portable terminal; and a transition unit that causes the portable terminal to transition from a first state to a second state in which electricity consumption is smaller than that of the first state, when a relation between a direction of the change detected by the first detection unit and a trend in the change in the physical quantity detected by the second detection unit satisfies a predetermined condition.

In a preferred embodiment, the second detection unit detects a change in a relative position of an object with respect to an operation surface, the object being located in a direction in which the operation surface faces; and the transition unit performs a transition upon an opposite relation being satisfied between a component of the direction of the change detected by the first detection unit, the component being parallel to the operation surface of the portable terminal, and the trend in the change detected by the second detection unit.

In another preferred embodiment, the transition unit performs the transition upon the opposite relation being satisfied, and upon the direction of the change detected by the first detection unit being a downward direction.

In another preferred embodiment, a speed-detection unit that detects a speed at which the portable terminal moves in the direction of the change detected by the first detection unit, is included, and the transition unit prevents the transition from being performed upon the speed-detection unit detecting a speed smaller than a predetermined speed while the opposite relation is satisfied.

In another preferred embodiment, an area-detection unit that detects an area of a portion on the operation surface, the portion facing the object, the object being located in the direction in which the operation surface faces, is included, and the transition unit prevents the transition from being performed upon the area detected by the area-detection unit, changing so as to decrease while the opposite relation is satisfied.

In another preferred embodiment, a distance-detection unit that detects a distance between the object and the operation surface is included, and the transition unit prevents the transition from being performed upon the distance detected by the distance-detection unit being greater than or equal to a threshold even if the opposite relation is satisfied.

In another preferred embodiment, the physical quantity represents at least one of brightness, volume of a sound, and wind strength surrounding the portable terminal; and the transition unit performs a transition upon the direction of the change detected by the first detection unit being a downward direction, and upon the physical quantity detected by the second detection unit decreasing.

In another preferred embodiment, a determination unit that determines a direction in which an operation surface faces is included, the physical quantity represents at least one of brightness, volume of a sound, and wind strength surrounding the portable terminal; the transition unit performs a transition upon a first condition being satisfied in which the direction of the change detected by the first detection unit is a downward direction, and in which an angle formed between the direction of the operation surface determined by the determination unit and a horizontal plane is included in a predetermined range and upon a decrease in the physical quantity being detected, and the transition unit performs a transition upon the first condition being not satisfied, and upon an opposite relation being satisfied between the direction of the change detected by the first detection unit and a direction of the change detected by the second detection unit.

In another aspect of the present invention, there is provided a transition method including the steps of: detecting a change in a position of a portable terminal; detecting a change in a physical quantity representing a surrounding condition of the portable terminal; and causing the portable terminal to transition from a first state to a second state in which electricity consumption is smaller than that of the first state, upon a relation between a direction of the change detected by the first detection unit and a trend in the change in the physical quantity detected by the second detection unit satisfying a predetermined condition.

In another aspect of the present invention, there is provided a program for causing a computer to execute the steps of: detecting a change in a position of a portable terminal; detecting a change in a physical quantity representing a surrounding condition of the portable terminal; and causing the portable terminal to transition from a first state to a second state in which electricity consumption is smaller than that of the first state, upon a relation between a direction of the change detected by the first detection unit and a trend in the change in the physical quantity detected by the second detection unit satisfying a predetermined condition.

According to the present invention, it is possible to increase accuracy of the determination in a portable terminal as to whether the portable terminal is stored, for transitioning a state of the portable terminal when it is determined that the portable terminal is stored.

DETAILED DESCRIPTION

First Embodiment

A portable terminal of a first embodiment of the present invention will be described below.

Configuration

Figure 1:
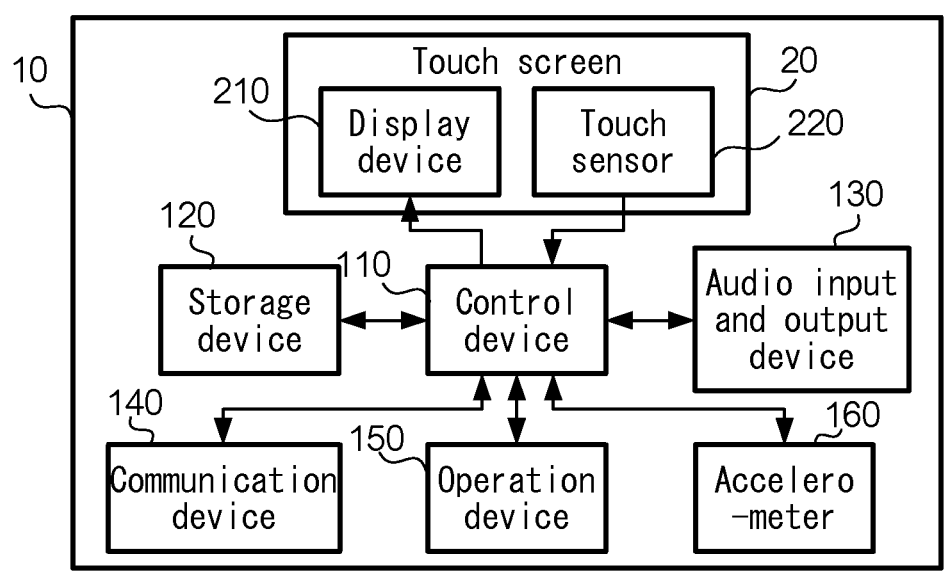
FIG. 1 is a block diagram showing a hardware configuration of a portable terminal of a first embodiment.

FIG. 1 is a block diagram showing a hardware configuration of portable terminal 10 of the first embodiment. Portable terminal 10 is a terminal carried by a user. For example, portable terminal 10 is a computer such as a smartphone or a tablet terminal. Portable terminal 10 includes control device 110, storage device 120, audio input and output device 130, communication device 140, operation device 150, accelerometer 160, and touch screen 20. Control device 110 includes a CPU (Central Processing Unit), a ROM (Read Only Memory), a RAM (Random Access Memory), and a real-time clock. The real-time clock has a function for calculating a current date and time. The CPU controls an operation of each of the devices of portable terminal 10 by executing a program stored in the ROM or storage device 120, using the RAM as a work area. Each of the devices includes a circuit (hereinafter referred to as a "switching circuit") for switching between a state in which electric power is supplied to the device and another state, in which no electric power is supplied to the device (a state of power supply). The CPU switches the state of power supply to each of the devices by controlling the switching circuits.

Storage device 120 is a memory means such as a flash memory or a hard-disk. Storage device 120 stores data used for control by control device 110, a program, etc. Storage device 120 also stores data representing a predetermined numerical value, such as a threshold, used in portable terminal 10. Audio input and output device 130 includes a speaker, a microphone, an audio processing circuit, etc. Audio input and output device 130 performs the input and output of a voice during a call. Communication device 140 includes a communication circuit for performing a wireless communication based on a standard such as that used for a mobile phone or that used for a wireless LAN. Communication device 140 performs mobile communications or wireless LAN communications. Operation device 150 includes an operation element such as a switch. Operation device 150 provides control device 110 with an operation signal according to an operation of the user. Control device 110 performs a processing according to the operation signal. Accelerometer 160 is a triaxial accelerometer for detecting acceleration in three directions that are orthogonal to each other. When portable terminal 10 moves, accelerometer 160 detects acceleration in the three directions, and provides control device 110 with data representing the detected acceleration.

Touch screen 20 includes display device 210 and touch sensor 220. Display device 210 is, for example, a liquid-crystal display. Display device 210 includes a display surface to display an image on the display surface. Touch sensor 220 is a flat and transparent sensor that includes an operation surface for receiving an operation from the user. Touch sensor 220 is provided so as to cover the display surface of display device 210. Details of touch screen 20 will be described with reference to FIG. 2.

Figure 2:
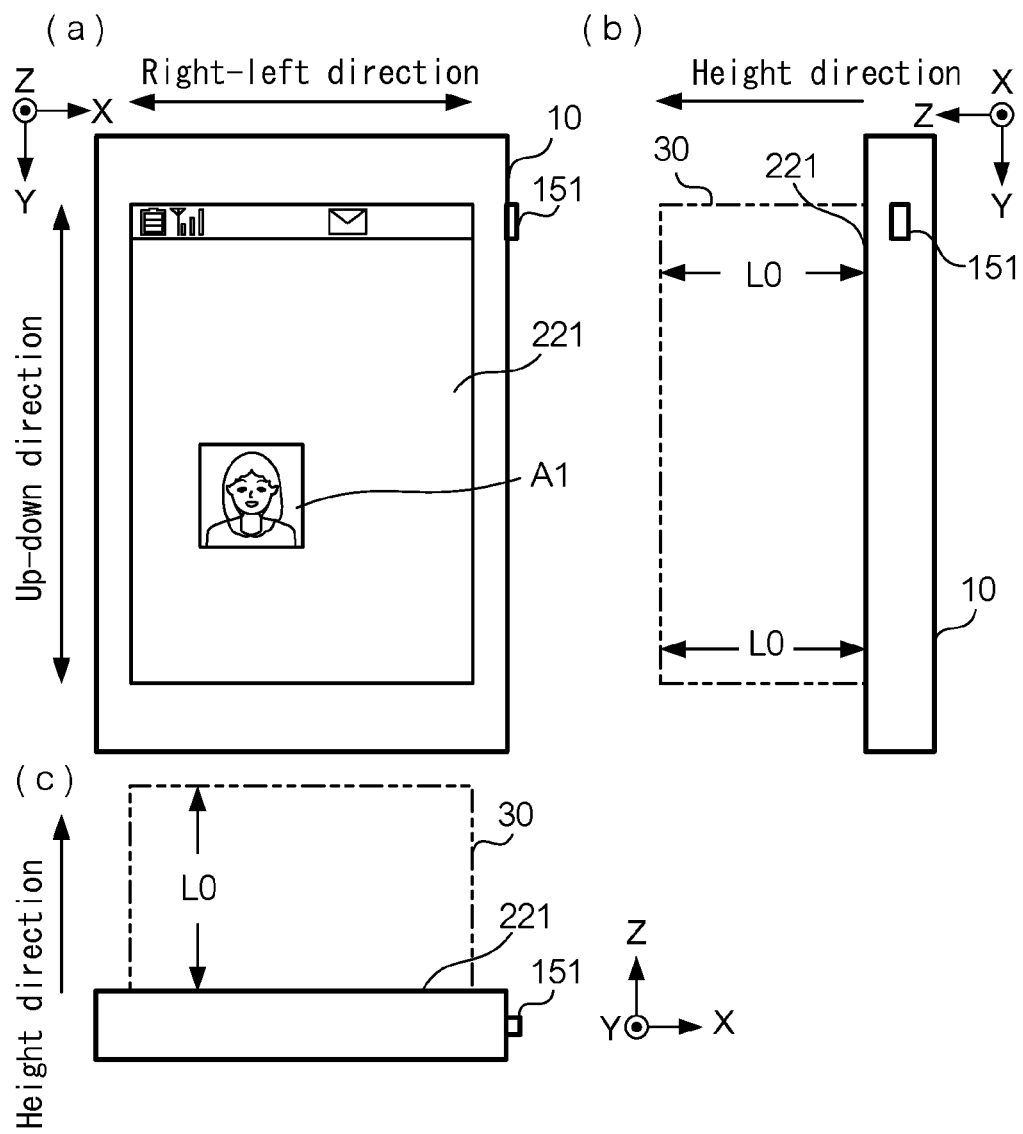
FIG. 2 is a diagram showing an example of an exterior of a portable terminal.

FIG. 2 is a diagram showing an example of an exterior of portable terminal 10. FIG. 2(2) shows portable terminal 10 as viewed from the front of operation surface 221 included in touch sensor 220. In the following drawings, as shown, for example, in FIG. 2(a), a direction along a long side of operation surface 221 is referred to as an up-down direction, and a direction along a short side of operation surface 221 is referred to as a right-left direction. In portable terminal 10, a position on operation surface 221 is represented by coordinates in two-dimensional Cartesian coordinate system, which is defined by two axes along the up-down direction and the right-left direction, and that has its origin at the upper-left corner of operation surface 221. FIG. 2(b) shows portable terminal 10 as viewed from the right side in the right-left direction. In the following drawings, as shown, for example, in FIG. 2(*b*), a direction apart from operation surface 221 along a perpendicular line of operation surface 221 is referred to as a height direction. FIG. 2(*c*) shows portable terminal 10 as viewed from the bottom in the up-down direction. Accelerometer 160 shown in FIG. 1 detects acceleration in three axial directions of X-axis direction along the right-left direction, Y-axis direction along the up-down direction, and Z-axis direction along the height direction.

Touch sensor 220 includes a plurality of electrostatic sensors (not shown) that are arranged in a grid pattern along operation surface 221. Each of the electrostatic sensors measures a distance from an object to a position (hereinafter referred to as a "sensor position") located nearest to the sensor on operation surface 221, when the object is located in the height direction above the sensor position. When an object (e.g., a finger) having electrical conductivity greater than or equal to a certain level, is located near operation surface 221, any one of the electrostatic sensors measures a distance based on electrostatic capacity of a condenser that is formed by the object and the sensors, and notifies control device 110 of the measurement together with a sensor position of the sensor, which is represented by coordinates in the above two-dimensional Cartesian coordinate system. Each of the electrostatic sensors measures a distance within distance L0 indicated by arrows shown in FIGS. 2(*b*) and 2(*c*). Distance L0 represents a maximum distance that electrostatic sensors are able to measure. In other words, when a pointer is located in a cuboid space (hereinafter referred to as a "measurement space") that is formed with operation surface 221 as its bottom, and that has a size of L0 in the height direction, touch sensor 220 is able to measure a distance to the pointer. In FIGS. 2(*b*) and 2(*c*), sides of measurement space 30 are represented by a dashed-two dotted line.

Since operation surface 221 covers the display surface of display device 210 as described above, an image displayed on the display surface is visible through operation surface 221. In other words, the image is displayed on operation surface 221. Thus, display device 210 serves as a display means for displaying an image on operation surface 221. As shown in FIG. 2(*a*), operation image A1 including an image of a person is displayed on operation surface 221. The operation image refers to an image displayed on display device 210 for allowing the user to operate portable terminal 10. The operation image is associated in advance with a processing that is to be executed when an operation is received. When the user performs an operation, such as a tap, long press, or drag, on operation surface 221 while indicating the operation image, an operation of the operation image is received, and the processing associated in advance with the operation image is executed.

The operation image may be operated without the operation of the user. For example, when the operation image is displayed, and when touch sensor 220 detects a distance to a skin or a metallic object located near a position where the operation image is displayed, while portable terminal 10 is located in a pocket or a bag, an operation of the operation image may be received, as is the case where the operation image is operated by the user. In this case, an operation not intended by the user is performed, and electric power is consumed. To prevent such an operation from being received, portable terminal 10 performs a processing (hereinafter referred to as a "lock processing") for transitioning from a state in which an operation is received (hereinafter referred to as an "operation-reception state") to another state, in which no operation is received (hereinafter referred to as a "lock state"). However, during the lock state, portable terminal 10 receives only an operation to perform a processing (hereinafter referred to as an "unlock processing") for transitioning from the lock state to the operation-reception state. Operation element 151 shown in FIG. 2 is included in operation device 150. Operation element 151 is a switch for making a transition between the operation-reception state and the lock state; namely, for causing portable terminal 10 to perform the lock processing and the unlock processing. Portable terminal 10 performs the lock processing and the unlock processing in turn each time operation element 151 is pressed, and transitions between the operation-reception state and the lock state.

Portable terminal 10 performs a processing (hereinafter referred to as an "automatic lock processing") for automatically transitioning from the operation-reception state to the lock state without an operation of operation element 151. Storage device 120 stores an automatic-lock-processing program for performing the automatic lock processing. The execution of the automatic-lock-processing program by control device 110 to control each of the devices shown in FIG. 1 causes the following functions to be implemented.

Figure 3:
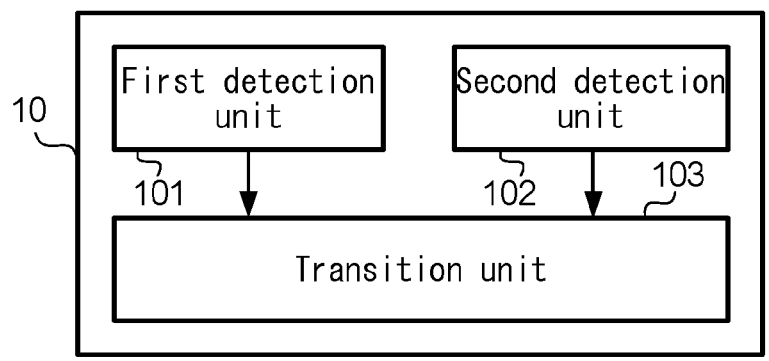
FIG. 3 is a block diagram showing a functional configuration of a portable terminal.

FIG. 3 is a block diagram showing a functional configuration of portable terminal 10. Portable terminal 10 includes first detection unit 101, second detection unit 102, and transition unit 103.

First detection unit 101 detects a change in a position of the terminal (portable terminal 10), and specifies a direction of the movement. The direction of the movement includes a direction (hereinafter referred to as a "first direction") along a surface (hereinafter referred to as a "terminal surface") that forms a housing of the terminal and that is used as a reference surface, and a vertical direction (hereinafter referred to as a "second direction"). The former is represented as a component, parallel to the terminal surface, of the direction of the movement of the terminal. The latter is represented as a vertical component of the direction of the movement. In the present embodiment, a direction in which the terminal moves along operation surface 221 (a component, parallel to the terminal surface, of the direction of the movement) is defined as the first direction. It is to be noted that first detection unit 101 detects only the first direction in the present embodiment. The detection of the second direction will be described in another embodiment. First detection unit 101 is a function implemented by cooperation between control device 110 and accelerometer 160 shown in FIG. 1. Specifically, first detection unit 101 detects the first direction in the manner described below.

When a certain time (e.g., one second) passes while the sum of acceleration, in the three axial directions of the above X-axis, Y-axis, and Z-axis, represented by data provided from accelerometer 160 is equal to acceleration of gravity (a unit of the acceleration of gravity is m/s$^2$), control device 110 determines that the terminal is not moving. When the acceleration changes after this determination, control device 110 calculates values obtained by integrating, with a predetermined time (e.g., one second), an amount of the change in acceleration in two axial directions of X-axis and Y-axis among the changed acceleration, as velocities (a unit of the velocities is m/s) at which the terminal moves in the two axial directions. Control device 110 calculates a vector that is the sum of vectors indicating the calculated velocities, namely a vector indicating a velocity at which the terminal moves along operation surface 221 (hereinafter referred to as a "surficial velocity vector"), and detects a direction indicated by the calculated surficial velocity vector as the first direction.

Figure 4:
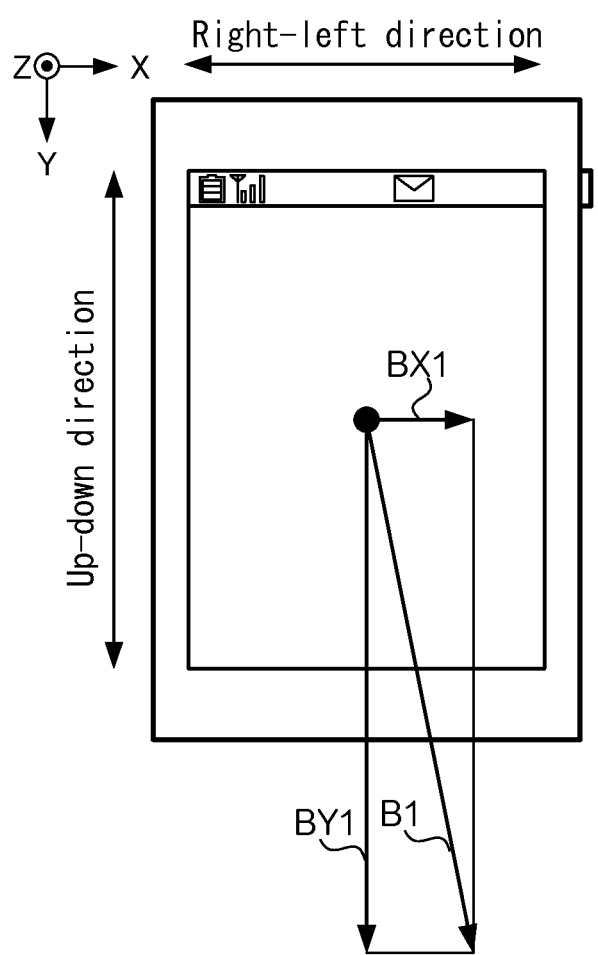
FIG. 4 is a diagram showing an example of a first direction detected by a first detection unit.

FIG. 4 is a diagram showing an example of the first direction detected by first detection unit 101. FIG. 4 shows vector BX1 indicating a velocity at which portable terminal 10 moves in X-axial direction, and vector BY1 indicating a velocity at which portable terminal 10 moves in Y-axis direction. When vectors BX1 and BY1 are calculated, first detection unit 101 calculates surficial velocity vector B1 that is the sum of vectors BX1 and BY1. The calculated surficial velocity vector B1 represents that portable terminal 10 moves along operation surface 221 in a direction (the first direction) toward the bottom right of operation surface 221. As described above, first detection unit 101 detects the first direction represented by the surficial velocity vector. First detection unit 101 performs this detection at intervals of a predetermined time (e.g., every one tenth of a second), and provides transition unit 103 with data representing the detected first direction (namely, data representing the surficial velocity vector) each time.

Second detection unit 102 detects a trend in the change in a physical quantity (hereinafter referred to as a "change direction") representing a surrounding condition of the terminal. The physical quantity referred to here mainly has two meanings. The first one is a relative position, with respect to the terminal, of an object (e.g., a body of the user or a pocket) located surrounding the terminal. The second one is a physical quantity representing an environment (such as brightness or a temperature) surrounding the terminal. In the present embodiment, second detection unit 102 detects, as the change direction of the first physical quantity, a direction of the change in a relative position, with respect to operation surface 221, of an object located in a direction in which operation surface 221 faces. This direction represents a direction in which the object moves as viewed from operation surface 221, and therefore this direction is hereinafter referred to as an "object-moving direction." It is to be noted that second detection unit 102 detects only the change direction of the first physical quantity in the present embodiment. The detection of the second physical quantity will be described in another embodiment. Second detection unit 102 of the present embodiment is a function implemented by cooperation between control device 110 and touch sensor 220. Specifically, second detection unit 102 detects the object-moving direction in the manner described below.

Control device 110 specifies, based on a sensor position and a height from the sensor position, which are represented by data provided from touch sensor 220, a region that is formed of the sensor position, from which the height of an object is measured, on operation surface 221, namely a region (hereinafter referred to as an "object-facing region") where the object is located in a range in which a distance in the height direction is able to be measured, and that faces the object on operation surface 221. Control device 110 performs this specification at intervals of a predetermined time (e.g., every one tenth of a second, and the interval is hereinafter referred to as a "region-specifying interval"). An example of the object-facing region specified by control device 110 will be described with reference to FIGS. 5 and 6.

Figure 5:
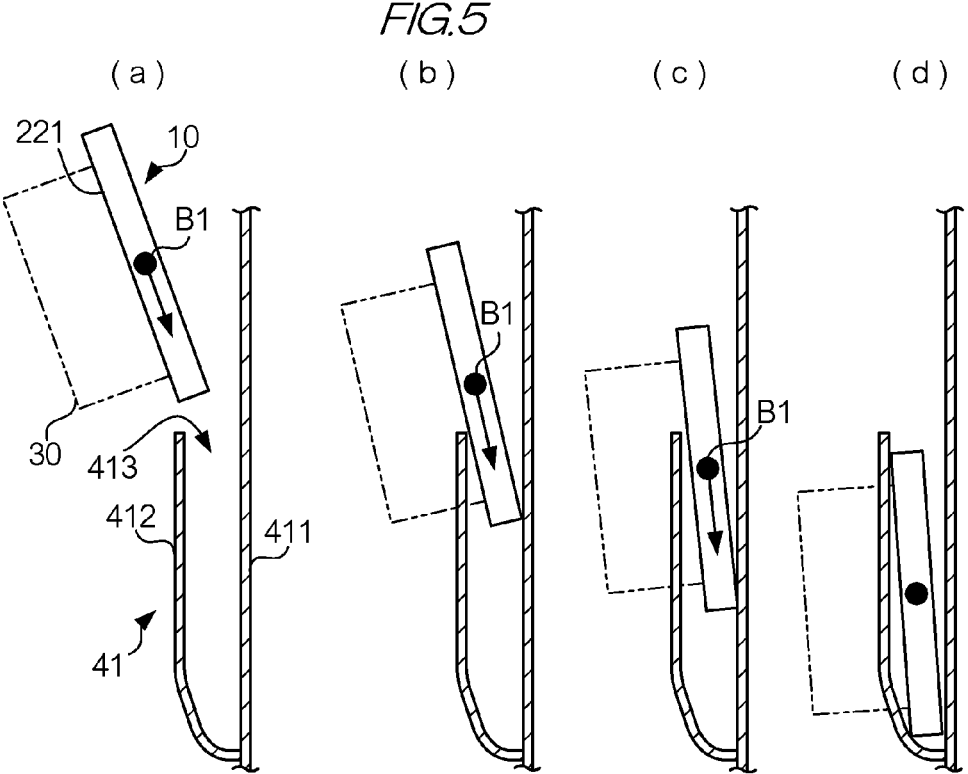
FIG. 5 is a diagram showing an example of a portable terminal stored in a pocket.

FIG. 5 is a diagram showing an example of portable terminal 10 stored in pocket 41. Pocket 41 is, for example, a breast pocket of a shirt. Pocket 41 includes cloth 411 of a main part of the shirt, and cloth 412 of the pocket, and allows the user to insert an object from opening 413 that is an opening of cloth 412. FIG. 5 shows a cross-section of pocket 41 as viewed from the side when opening 413 of pocket 41 opens upward. FIG. 5 shows portable terminal 10 at consecutive times during the above region-specifying interval. FIG. 5(a) shows portable terminal 10 as viewed in the right-left direction. In FIG. 5(a), portable terminal 10 is about to be inserted in opening 413 while moving in the first direction that is indicated by surficial velocity vector B1 shown in FIG. 4.

In the example of FIG. 5, portable terminal 10 is stored in pocket 41 while operation surface 221 faces cloth 412. FIGS. 5(b) and 5(c) show portable terminal 10, the downward one-thirds and two-thirds of which are inserted in pocket 41, while moving in the same first direction as shown in FIG. 5(a). FIG. 5(d) shows a state in which the whole of portable terminal 10 has been inserted in pocket 41, and the movement has been terminated. The object-facing region specified by second detection unit 102 when portable terminal 10 is stored in pocket 41 in this way, is shown in FIG. 6.

Figure 6:
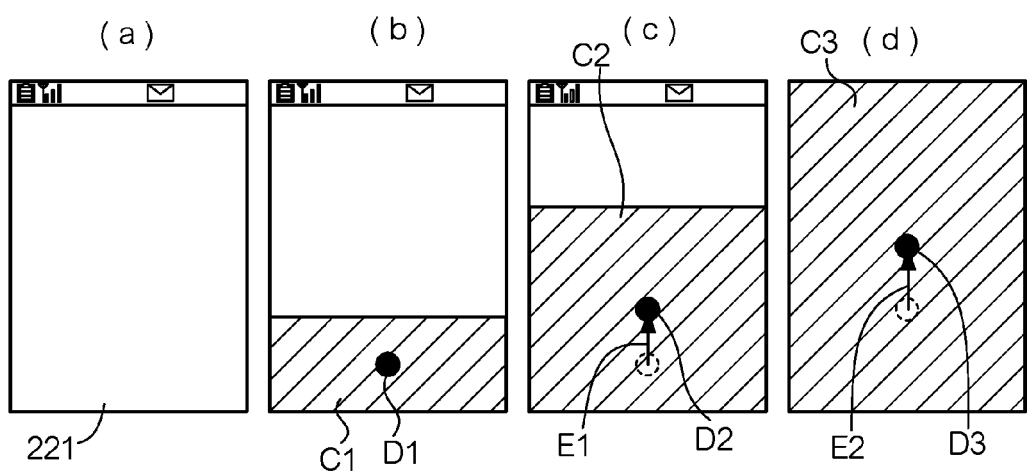
FIG. 6 is a diagram showing an example of an object-facing region specified by a second detection unit.

FIG. 6 is an example of an object-facing region specified by second detection unit 102. FIG. 6(a) shows operation surface 221 of portable terminal 10 shown in FIG. 5(a). In this case, since no object is located in measurement space 30, the object-facing region is not specified. FIGS. 6(b), 6(c), and 6(d) show object-facing regions C1, C2, and C3 specified by portable terminal 10 shown in FIGS. 5 (b), 5(c), and 5(d), respectively. Object-facing region C1 is a rectangular region formed with a short side and a part of long sides of operation surface 221 as its sides. Object-facing region C1 occupies the downward approximately one-third of an area of operation surface 221. Object-facing region C2 is a rectangular region similar to object-facing region C1. Object-facing region C2 occupies the downward two-thirds of the area of operation surface 221. Object-facing region C2 is a region occupying the whole of operation surface 221. FIGS. 6(b), 6(c), and 6(d) show object-facing regions specified at consecutive times during the above region-specifying interval.

Control device 110 calculates the center of gravity of the specified object-facing region each time the object-facing region is specified. In the example of FIG. 6, control device 110 calculates centers of gravity D1, D2, and D3 of object-facing regions C1, C2, and C3. Control device 110 calculates, each time the center of gravity is calculated, a vector that is directed toward the center of gravity calculated at this time from the center of gravity calculated at a time earlier by the region-specifying interval, namely a vector (hereinafter referred to as an "object's velocity vector") representing the movement of an object along operation surface 221. Control device 110 detects a direction indicated by the calculated object's velocity vector as the object-moving direction. In the example of FIG. 6, when center of gravity D2 is calculated, control device 110 detects, as the object-moving direction, a direction indicated by object's velocity vector E1 that is directed toward center of gravity D2 from center of gravity D1. When center of gravity D3 is calculated, control device 110 detects, as the object-moving direction, a direction indicated by object's velocity vector E2 that is directed toward center of gravity D3 from center of gravity D2. In this example, an upward direction of the up-down direction on operation surface 221 is detected as the object-moving direction. Second detection unit 102 provides transition unit 103 with data representing the detected object-moving direction (namely, data representing the object's velocity vector) each time the above detection is performed.

Although FIG. 5 shows an example in which portable terminal 10 is stored in pocket 41 while operation surface 221 faces cloth 412, even if portable terminal 10 faces an opposite side, second detection unit 102 detects the object-moving direction in the same manner as described above.

Figure 7:
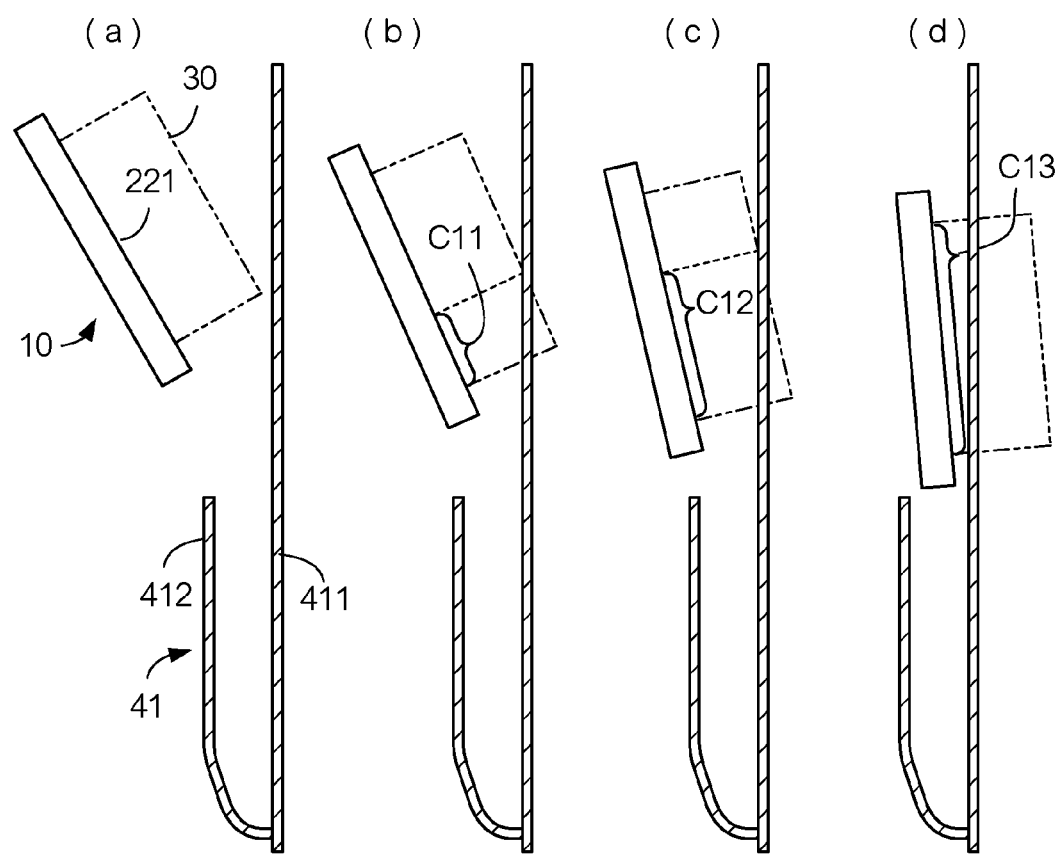
FIG. 7 is a diagram showing an example of a portable terminal stored in a pocket.

FIG. 7 is a diagram showing an example of portable terminal 10 stored in pocket 41. In the example of FIG. 7, a portable terminal 10 is stored in pocket 41 while operation surface 221 faces cloth 411. In FIG. 7(a), portable terminal 10 and cloth 411 are located apart from each other such that no part of cloth 411 of the main part of the shirt intrudes into measurement space 30 of portable terminal 10. In FIG. 7(b), a part of cloth 411 intrudes into a lower portion of measurement space 30. As a result, object-facing region C11 occupying the downward one-third of operation surface 221 is specified by second detection unit 102.

In FIG. 7(c), a part of cloth 411 intrudes into a much wider lower portion of measurement space 30. As a result, object-facing region C12 occupying the downward second-third of operation surface 221 is specified by second detection unit 102. In FIG. 7(d), a part of cloth 411 intrudes into the whole of measurement space 30. As a result, object-facing region C13 occupying the whole of operation surface 221 is specified by second detection unit 102. Second detection unit 102 specifies object-facing regions C11, C12, and C13 as described above, and thereby second detection unit 102 calculates the object's velocity vector in a similar manner to the example of FIG. 6. Second detection unit 102 detects a direction indicated by the calculated object's velocity vector as the object-moving direction. Also in the example of FIG. 7, the upward direction of the up-down direction on operation surface 221 is detected as the object-moving direction, similarly to the example of FIGS. 5 and 6. In other words, approximately the same object-moving direction is detected even if operation surface 221 faces the opposite side.

Transition unit 103 is a transition means for transitioning a state of the terminal when a relation between the direction of the movement detected by first detection unit 101 and the change direction detected by second detection unit 102, is the predetermined relation. The predetermined relation referred to here is a relation between the direction of the movement and the change direction that are detected when the terminal (portable terminal 10) is stored in a storage space such as a pocket or a bag. In the present embodiment, transition unit 103 transitions the state of the terminal when a relation between the first direction detected by first detection unit 101 and the object-moving direction detected by second detection unit 102 is a relation (hereinafter referred to as an "oppositely directed relation") that one direction and a component of another direction along a line of the one direction are oppositely directed.

In other words, the relation that two directions are oppositely directed does not have to mean only an example in which vectors of the directions form an angle of 180 degrees. For example, it is possible that the oppositely directed relation is satisfied when two vectors indicating the first direction and the second direction form an angle of 90 to 180 degrees, and that the oppositely directed relation is not satisfied when the two vectors form an angle of 0 to 90 degrees.

Transition unit 103 is a function implemented by control device 110 controlling each of the devices shown in FIG. 1. A way used by control device 110 to determine whether the oppositely directed relation is satisfied will be described in detail with reference to FIG. 8.

Figure 8:
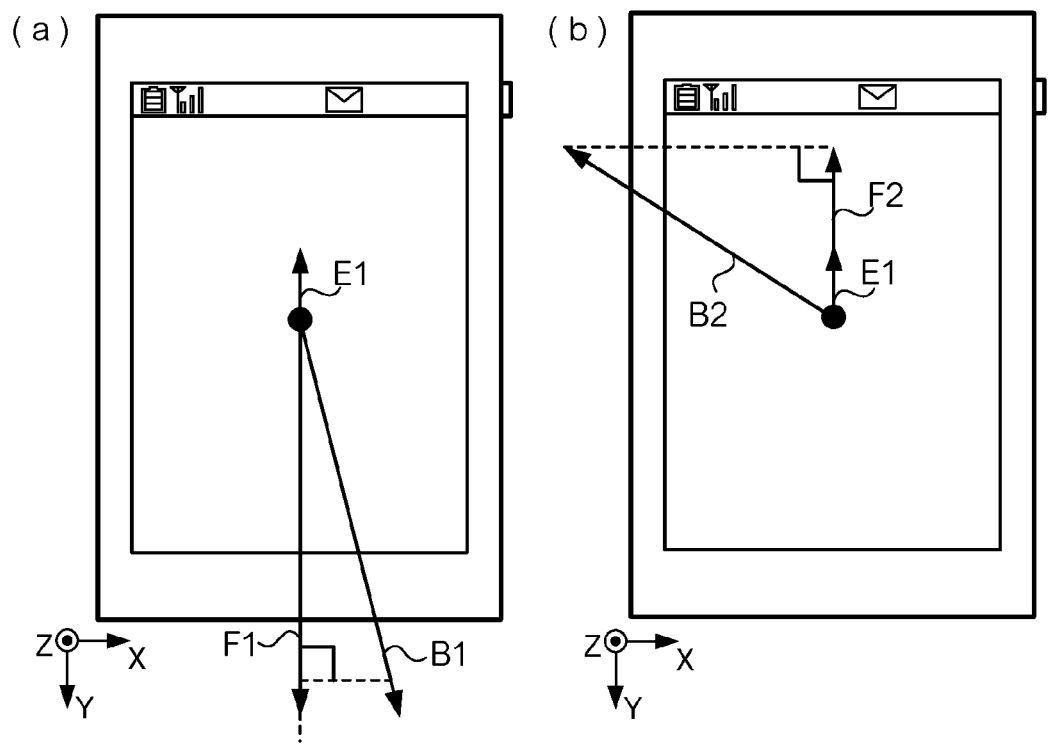
FIG. 8 is a diagram showing an example of results of detection of a first detection unit and a second detection unit.

FIG. 8 is a diagram showing an example of results of the detection of first detection unit 101 and second detection unit 102. FIG. 8(a) shows surficial velocity vector B1 shown in FIG. 4 and object's velocity vector E1 shown in FIG. 6.

For example, control device 110 sets a direction indicated by object's velocity vector E1 to one direction, and sets a direction indicated by surficial velocity vector B1 to another direction. In the example shown in FIG. 8(a), control device 110 calculates, based on these vectors, vector F1 as a component of surficial velocity vector B1 along a line of object's velocity vector E1. In this case, control device 110 determines that the above oppositely directed relation is satisfied because one direction indicated by object's velocity vector E1 and a component of another direction (namely, surficial velocity vector B1) indicated by calculated vector F1 are oppositely directed.

FIG. 8(b) shows another surficial velocity vector B2 and object's velocity vector E1. In the example shown in FIG. 8(b), control device 110 calculates, based on these vectors, vector F2 as a component of surficial velocity vector B2 along a line of object's velocity vector E1. In this case, control device 110 determines that the above oppositely directed relation is not satisfied because one direction indicated by object's velocity vector E1 and a component of another direction (namely, surficial velocity vector B2) indicated by calculated vector F2 are not oppositely directed.

Control device 110 determines whether the oppositely directed relation is satisfied as described above, and transitions the state of the terminal if it is determined that the oppositely directed relation is satisfied. More specifically, control device 110 transitions the state of the terminal from a first state to a second state in which electricity consumption is smaller than that of the first state. In the present embodiment, the first state is the above operation-reception state, and the second state is the above lock state. In this case, a processing performed by control device 110 for transitioning the state of the terminal from the first state to the second state, is the above lock processing.

During operation-reception state, control device 110 receives an operation as described below. Control device 110 determines, based on a distance and a sensor position that are represented by data provided from touch sensor 220, a region having a distance smaller than or equal to a threshold (e.g., 1 mm) as a region (hereinafter referred to as a "contact region") in which a pointer is in contact with operation surface 221. Control device 110 detects a position of the center of gravity of the contact region as an indication position. When an operation image is displayed at the detected indication position, control device 110 determines whether an operation, such as a long press and a drag, is performed in that state. When it is determined that any one of these operations is performed, control device 110 receives the operation, and executes a processing associated with a combination of the operation image and received operation. For example, when a tap operation performed on operation image A1 shown in FIG. 2 is received, control device 110 executes a processing for displaying an image associated with operation image A1. When a drag operation performed on operation image A1 is received, control device 110 executes a processing for changing a display position of operation image A1. In any of these cases, control device 110 receives an operation performed on operation image A1 that is displayed at the indication position, namely an operation corresponding to the indication position.

When it is determined whether the oppositely directed relation is satisfied as described above, control device 110 controls the switching circuit, which is described with reference to FIG. 1, included in touch sensor 220 to prevent electric power from being supplied to touch sensor 220. This causes portable terminal 10 to transition to the above lock state in which no operation can be received. In portable terminal 10 whose state is transitioned to the lock state, touch sensor 220 no longer consumes electric power, and various components no longer operate in response to a user operation. Thus, power consumption is smaller than that of the operation-reception state. In other words, transition unit 103 transitions the state of the terminal from the operation-reception state to the lock state in which power consumption is smaller than that of the operation-reception state, when the oppositely directed relation is satisfied.

Operation

Portable terminal 10 executes the above automatic lock processing (a processing for transitioning from the operation-reception state to the lock state automatically) under the above configuration. Portable terminal 10 executes the automatic-lock-processing program, which is described with reference to FIG. 3, upon transitioning the operation-reception state, to start the automatic lock processing.

Figure 9:
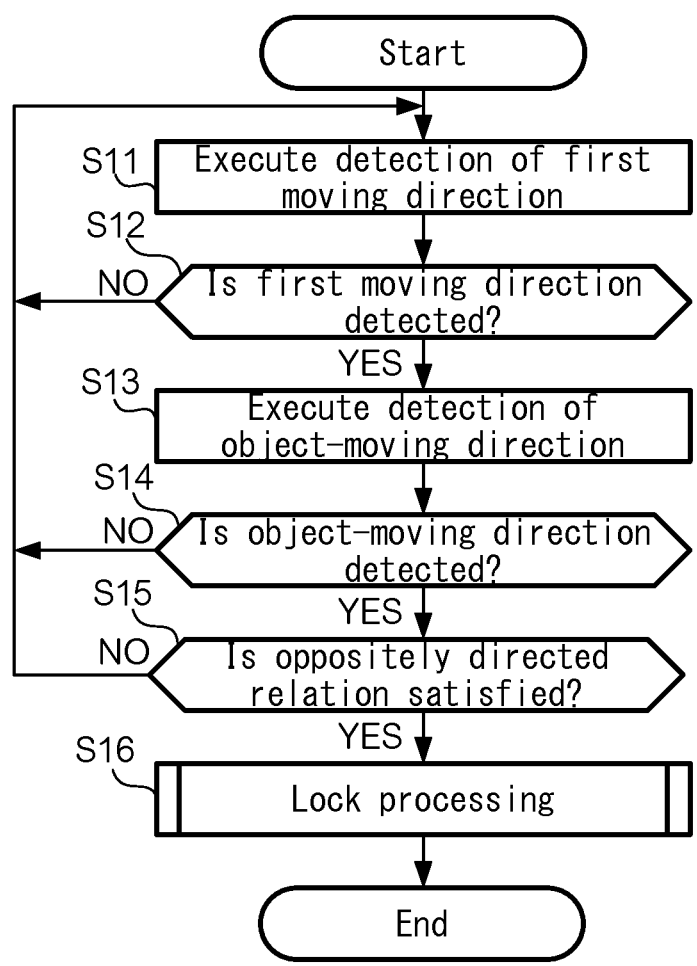
FIG. 9 is a flowchart showing an example of an operation in an automatic lock processing.

FIG. 9 is a flowchart showing an example of an operation performed in the automatic lock processing by portable terminal 10. Portable terminal 10 firstly executes the detection of the first direction (step S11). Step S11 is an operation performed by first detection unit 101 shown in FIG. 3.

Portable terminal 10 then determines whether the first direction is detected (step S12). If it is determined that the first direction is not detected in step S12 (step S12: NO), portable terminal 10 returns to step S11 to perform the operation of step S11. Meanwhile, if it is determined that the first direction is detected (step S12: YES), portable terminal 10 executes the detection of the object-moving direction (step S13). Steps S12 and S13 are operations performed by second detection unit 102.

Portable terminal 10 then determines whether the object-moving direction is detected (step S14). If it is determined that the object-moving direction is not detected (step S14: NO), portable terminal 10 returns to step S11 to perform the operation of step S11. Meanwhile, if it is determined that the object-moving direction is detected (step S14: YES), portable terminal 10 determines whether the above oppositely directed relation is satisfied based on the first direction detected in step S11 and the object-moving direction detected in step S13 (step S15). If it is determined that the oppositely directed relation is not satisfied (step S15: NO), portable terminal 10 returns to step S11 to perform the operation of step S11. Meanwhile, if it is determined that the oppositely directed relation is satisfied (step S15: YES), portable terminal 10 executes the above lock processing (step S16). Steps S14, S15, and S16 are operations performed by transition unit 103.

When the storage space in which portable terminal 10 is stored is a pocket, the oppositely directed relation is always satisfied between a direction, in which the terminal moves along operation surface 221 (namely, the first direction), and a direction, in which an object covering operation surface 221 (e.g., a cloth of the pocket) moves relative to operation surface 221 (namely, the object-moving direction), unless the pocket moves together with portable terminal 10. In the example shown in FIGS. 5 and 6, since surficial velocity vector B1 indicating the first direction is a downward direction along operation surface 221, and object's velocity vectors E1 and E2 indicating the object-moving direction are an upward direction along operation surface 221, the first direction and the object-moving direction have the oppositely directed relation as shown in FIG. 8(*a*). Also in the example shown in FIG. 7, this oppositely directed relation is satisfied.

Satisfying the oppositely directed relation based on the detected first direction and object-moving direction means that a relation between the detected moving direction (the first direction) and change direction (the object-moving direction) is equal to a relation between a moving direction and a change direction that are detected when the terminal is stored in the storage space. As described above, portable terminal 10 determines whether the terminal is stored in the storage space based on the relation between the moving direction and the change direction. This allows increase of accuracy in the determination in the portable terminal that the portable terminal is stored, for transitioning its state when it is determined that the portable terminal is stored in the storage space, compared with a case where this determination is performed based on only either of the moving direction and the change direction.

Second Embodiment

In the second embodiment of the present invention, portable terminal 10 transitions the state of the terminal based on, in addition to the first direction and the object-moving direction, the above second direction, namely a vertical component of the moving direction of the terminal. In the following description, a difference from the first embodiment will be mainly described. First detection unit 101 of the present embodiment is a function implemented by cooperation between control device 110 and accelerometer 160 shown in FIG. 1, similarly to the first embodiment. Specifically, first detection unit 101 detects the second direction in the manner described below.

When a certain time (e.g., one second) passes while the sum of acceleration, in the three axial directions of the X-axis, Y-axis, and Z-axis, represented by data provided from accelerometer 160 is equal to acceleration of gravity (a unit of the acceleration of gravity is $m/s^2$), control device 110 determines that the terminal is not moving. In this case, control device 110 calculates a vector that is the sum of vectors indicating acceleration in the three axial directions as a vector indicating a vertically downward direction (hereinafter referred to as a "vertically downward vector"). When acceleration in at least one of the axial directions changes after the above determination, control device 110 calculates values obtained by integrating, with a predetermined time (e.g., one second), an amount of the change in the acceleration in the three axial directions, as velocities (a unit of the velocities is m/s) at which the terminal moves in the three axial directions. Control device 110 calculates a vector that is the sum of vectors indicating the calculated velocities, namely a vector (hereinafter referred to as a "velocity vector") indicating a velocity at which the terminal moves.

Control device 110 calculates a vector (referred to as a "vertical velocity vector") indicating a component of the calculated velocity vector along a direction indicated by the vertically downward vector. The vertically downward vector and vertical velocity vector calculated as described above indicate the second direction of portable terminal 10. For example, if the vertical velocity vector is a vector indicating the same direction as the vertically downward vector, it is indicated that the second direction is a vertically downward direction. If the vertical velocity vector is a vector indicating an opposite direction, it is indicated that the second direction is a vertically upward direction. First detection unit 101 detects the second direction indicated by the vertically downward vector and vertical velocity vector in this way.

Figure 10:
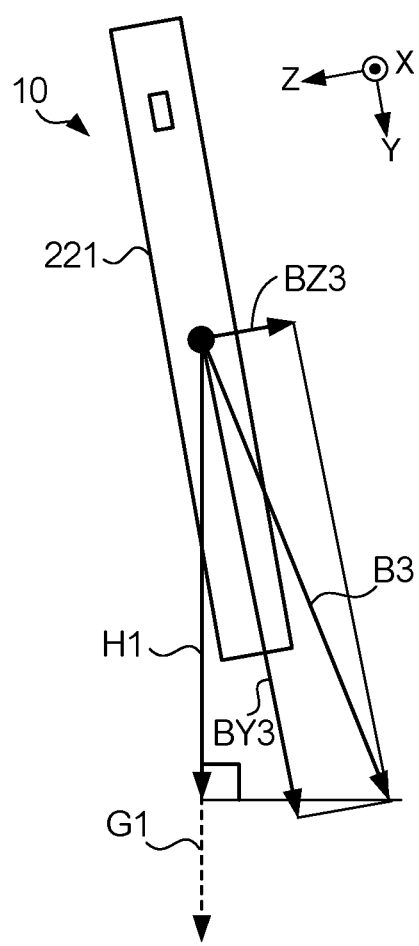
FIG. 10 is a diagram showing an example of a second direction detected by a third detection unit.

FIG. 10 is a diagram showing an example of a second direction detected by first detection unit 101. First detection unit 101 calculates vertically downward vector G1 in advance while portable terminal 10 is stationary. After that, when portable terminal 10 moves, first detection unit 101 calculates vector BY3 indicating a velocity at which portable terminal 10 moves in Y-axis direction, and vector BZ3 indicating a velocity at which portable terminal 10 moves in Z-axis direction. In this example, it is assumed that portable terminal 10 does not move in X-axis direction. First detection unit 101 calculates velocity vector B3 that is the sum of calculated vectors BY3 and BZ3. Calculated velocity vector B3 indicates a direction in which portable terminal 10 moves. First detection unit 101 calculates vector H1 indicating a component of calculated velocity vector B3 along a direction indicated by vertically downward vector G1 as the vertical velocity vector. First detection unit 101 detects the second direction (in this example, a vertically downward direction) indicated by vertically downward vector G1 and vertical velocity vector H1 that are calculated in this way. First detection unit 101 performs this detection at the above third detection interval, and provides transition unit 103 with data representing the detected second direction (namely, data representing the vertically downward vector and the vertical velocity vector) each time the second direction is detected.

Transition unit 103 transitions the state of the terminal when the above oppositely directed relation is satisfied, and when the second direction detected by first detection unit 101 is the vertically downward direction.

Portable terminal 10 executes the following automatic lock processing under the above configuration.

Figure 11:
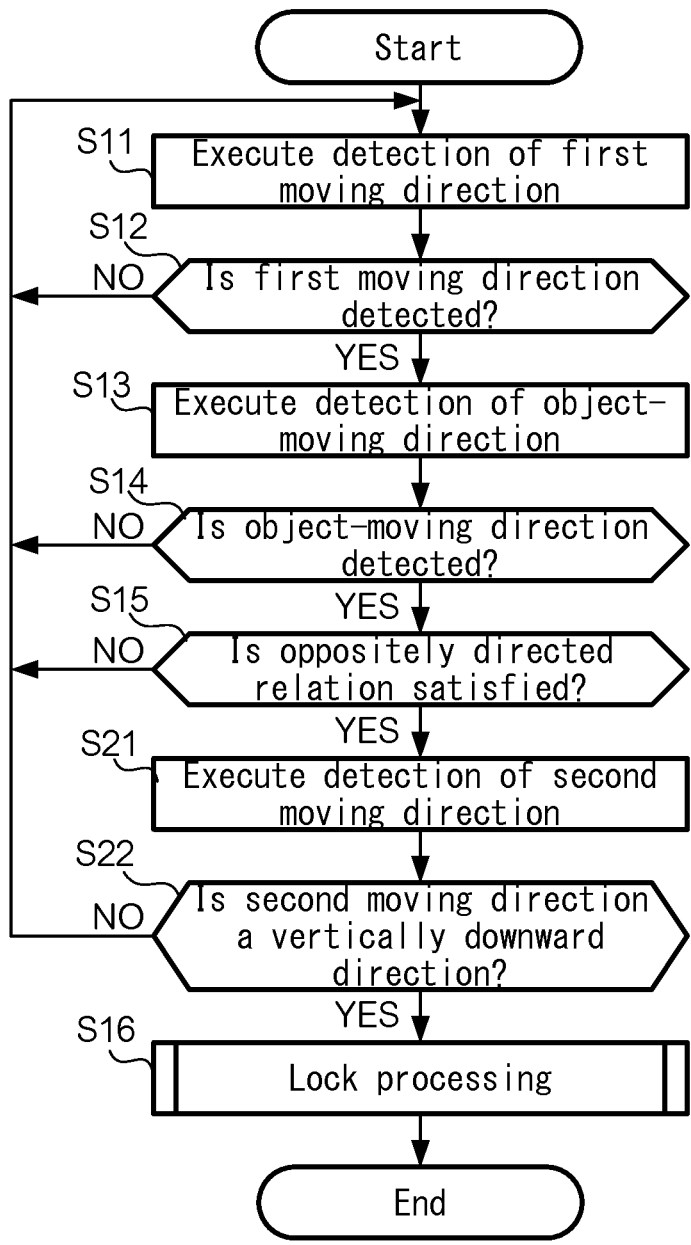
FIG. 11 is a flowchart showing an example of an operation in an automatic lock processing.

FIG. 11 is a flowchart showing an example of an operation performed in an automatic lock processing by portable terminal 10. Portable terminal 10 performs the same operations as those of steps S11 to S15 shown in FIG. 9. If it is determined that the oppositely directed relation is satisfied (YES) in step S15, portable terminal 10 executes the detection of the second direction (step S21). In the present embodiment, steps S14, S15, and S21 are operations performed by first detection unit 101.

Portable terminal 10 then determines whether the second direction detected in step S21 is the vertically downward direction (step S22). If it is determined that the second direction is not the vertically downward direction (step S22: NO), portable terminal 10 returns to step S11 to perform the operation of step S11. Meanwhile, if it is determined that the second direction is the vertically downward direction (step S22: YES), portable terminal 10 proceeds to step S16 to execute the lock processing. Step S22 is an operation performed by transition unit 103.

Since a stored object is held by a bottom portion located in the vertically downward direction in a variety of storage spaces, such as pockets and bags, the portable terminal is more often stored while moving in the downward direction, compared with a case where the portable terminal is stored while moving in the upward direction. In other words, when the detected second direction is the vertically downward direction, the portable terminal is more likely to be stored in the storage space, compared with a case where the detected second direction is the vertically upward direction. Thus, according to the present embodiment, it is possible to increase accuracy of the determination in the portable terminal that the portable terminal is stored, for transitioning its state when it is determined that the portable terminal is stored in the storage space, compared with a case where this determination is performed without depending on the second direction (namely, the vertical component of the moving direction).

Third Embodiment

In a third embodiment of the present invention, second detection unit 102 detects the above second physical quantity, namely a trend in the change in the physical quantity representing an environment surrounding the terminal. More specifically, second detection unit 102 of the present embodiment detects either of a direction in which brightness increases (hereinafter referred to as an "increasing direction") and a direction in which brightness decreases (hereinafter referred to as a "decreasing direction"), as a direction of the change in brightness surrounding the terminal (hereinafter referred to as a "change direction of brightness"). When the brightness surrounding the terminal does not change, second detection unit 102 detects no change direction. In the following description, a difference from the first and the second embodiments will be mainly described.

Figure 12:
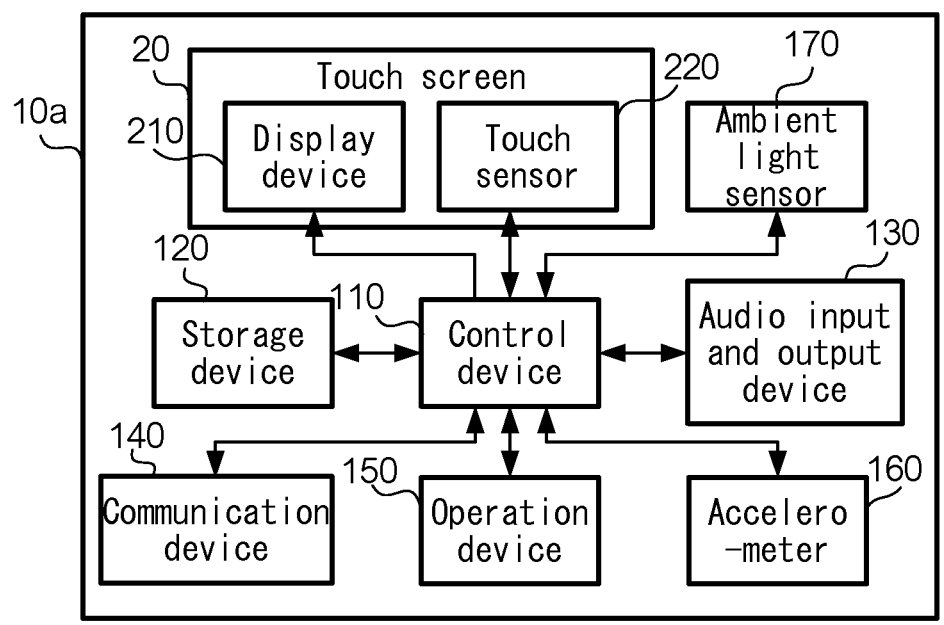
FIG. 12 is a block diagram showing a functional configuration of a portable terminal.

FIG. 12 is a block diagram showing a hardware configuration of portable terminal 10a of the present modification. Portable terminal 10a includes ambient light sensor 170 in addition to the devices shown in FIG. 1. Ambient light sensor 170 includes a detection surface provided on operation surface 221 of portable terminal 10a for detecting illumination. Ambient light sensor 170 detects illumination on the detection surface. Ambient light sensor 170 provides control device 110 with data representing the detected illumination.

Second detection unit 102 of the present modification is a function implemented by cooperation of control device 110 with above ambient light sensor 170. Specifically, control device 110 detects illumination represented by data that is provided from ambient light sensor 170, as brightness surrounding the terminal. When the detected brightness (namely, illumination) increases during a predetermined period (e.g., a period of one tenth of a second), second detection unit 102 detects that the change direction of brightness is the increasing direction. When the detected brightness decreases during this period, second detection unit 102 detects that the change direction of brightness is the decreasing direction. Second detection unit 102 provides transition unit 103 with data representing the detected change direction of brightness.

First detection unit 101 provides transition unit 103 with data representing the second direction described in the second embodiment. Transition unit 103 transitions the state of the terminal when a relation between the second direction detected by first detection unit 101 and the change direction detected by second detection unit 102 is a relation that the detected second direction is the vertically downward direction, and that the detected change direction is the decreasing direction. Portable terminal 10a executes the above automatic lock processing under the above configuration.

Figure 13:
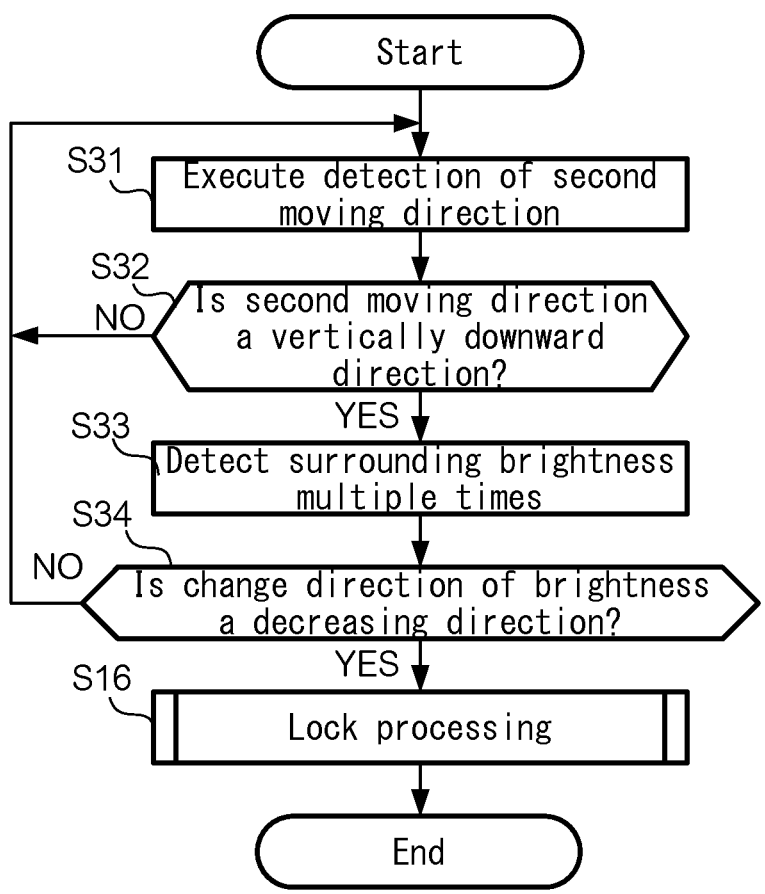
FIG. 13 is a flowchart showing an example of an operation in an automatic lock processing.

FIG. 13 is a flowchart showing an example of an operation performed in an automatic lock processing by portable terminal 10a. Portable terminal 10a firstly executes the detection of the second direction (step S31). Step S31 is an operation performed by the first detection unit 101 shown in FIG. 3. Portable terminal 10a then determines whether the detected second direction is a vertically downward direction (step S32). If it is determined that the second direction is not the vertically downward direction (step S32: NO), portable terminal 10a returns to step S31 to perform the operation of step S31.

Meanwhile, if it is determined that the second direction is the vertically downward direction (step S32: YES), portable terminal 10a detects brightness surrounding the terminal multiple times (step S33). In step S33, portable terminal 10a detects brightness at an interval of a predetermined time (e.g., one tenth of a second) in a predetermined period (e.g., two seconds). Steps S32 and S33 are operations performed by second detection unit 102. Portable terminal 10a then determines, based on the brightness detected at the interval of the predetermined time in step S33, whether surrounding brightness decreases; namely, the change direction of brightness is the decreasing direction (step S34). If it is determined that the change direction of brightness is not the decreasing direction (step S34: NO), portable terminal 10a returns to step S31 to perform the operation of step S31. Meanwhile, if it is determined that the change direction of brightness is the decreasing direction (step S34: YES), portable terminal 10a proceeds to step S16 to perform the lock processing.

When the portable terminal is stored in the storage space, there is a possibility that the touch sensor is unable to measure the height from the sensor position, and as a result the object-moving direction described in the first and the second embodiments is not detected, depending on a size of the storage space and a way of storage.

Figure 14:
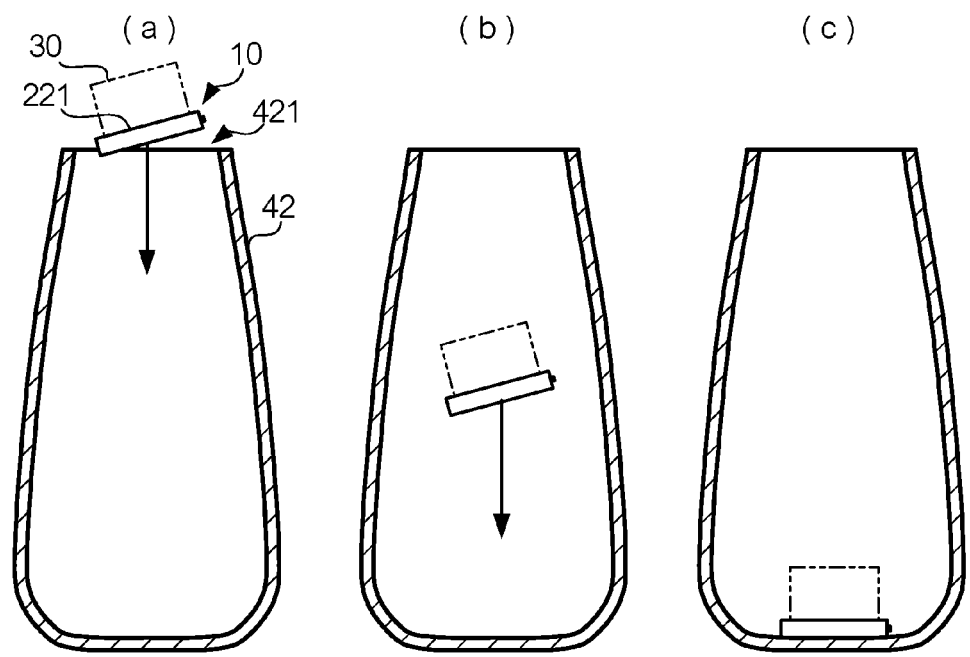
FIG. 14 is a diagram showing an example of a portable terminal stored in a pocket.

FIG. 14 is a diagram showing an example of portable terminal 10 stored in bag 42. Bag 42 stores an object inserted from opening 421. A size of opening 421 is wider than a size in the right-left direction of portable terminal 10. Bag 42 also contains a space having a width greater than this size. In this example, as shown in FIGS. 14(a), 14(b), and 14(c) sequentially, portable terminal 10 falls from opening 421 to the inside of bag 42 and is stored in bag 42 while operation surface 221 faces in the vertical upward direction. In this example, it is assumed that a hand of the user is not inserted into measurement space 30. In this case, since no part of bag 42 is inserted in measurement space 30 when portable terminal 10 is stored in bag 42, the height from the sensor position cannot be measured and, as a result, the object-moving direction cannot be detected.

When the portable terminal is stored as shown in FIG. 14, brightness surrounding the portable terminal decreases compared with that before the portable terminal is stored, because the stored portable terminal is covered by bag 42. As described above, portable terminal 10a executes the lock processing when the terminal moves in the vertically downward direction and the area surrounding the terminal becomes dark. Thus, according to portable terminal 10a of the present embodiment, it is possible to transition the state of the terminal even if the terminal is stored in the storage space in such a state that the height from the sensor position cannot be measured as shown in FIG. 14. Portable terminal 10a also determines whether the terminal is stored in the storage space based on the relation between the moving direction and the change direction, similarly to the first and the second embodiments. Thus, according to the present embodiment, it is possible to increase accuracy of the determination in the portable terminal that the portable terminal is stored, for transitioning its state when it is determined that the portable terminal is stored in the storage space, compared with a case where this determination is performed based on only either of the moving direction and the change direction, similarly to these embodiments.

Fourth Embodiment

A fourth embodiment of the present invention is different from the above embodiments in that the portable terminal selectively uses two different methods based on an attitude of the terminal and a direction in which the terminal moves in the vertical direction (namely, the second direction described in the second embodiment) when determining whether to transition the state of the terminal. One of the two methods is the method described in the first or the second embodiment, the other is the method described in the third embodiment. In the following description, a difference from the above embodiments will be mainly described in an example in which the portable terminal selectively uses the method described in the first embodiment and the method described in the third embodiment.

Figure 15:
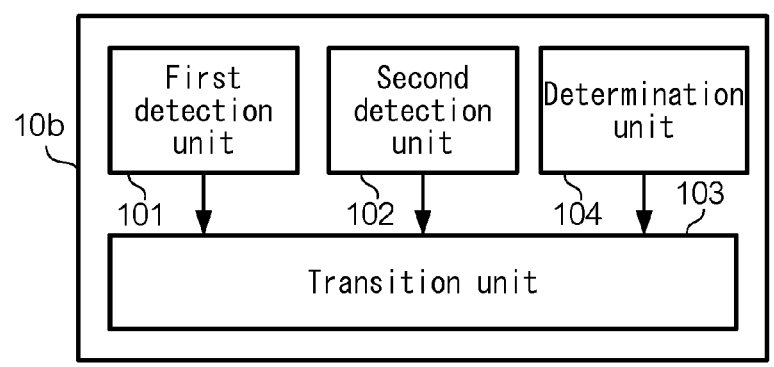
FIG. 15 is a block diagram showing a functional configuration of a portable terminal.

FIG. 15 is a block diagram showing a functional configuration of portable terminal 10b of the present embodiment. Portable terminal 10b includes a hardware configuration similar to that of portable terminal 10a shown in FIG. 12. Portable terminal 10b also includes determination unit 104 in addition to the functions shown in FIG. 3. First detection unit 101 detects a direction in which the terminal moves along the terminal surface; namely, the first direction. First detection unit 101 also detects a direction in which the terminal moves in the vertical direction; namely, the second direction. Second detection unit 102 detects a change direction in a relative position, with respect to the terminal surface, of an object located in a direction in which the terminal surface faces; namely, the object-moving direction, as a first change direction. Second detection unit 102 also detects a change direction of brightness surrounding the terminal as a second change direction. In the present embodiment an example will be described in which operation surface 221 is used as the terminal surface.

Determination unit 104 detects the attitude of the terminal. Specifically, determination unit 104 determines a direction in which the terminal surface (in the present embodiment, operation surface 221) faces. Determination unit 104 is a function implemented by cooperation between control device 110 and accelerometer 160 shown in FIG. 1. Specifically, determination unit 104 performs this determination in the manner described below.

Control device 110 calculates a vertically downward vector as represented by G1 in FIG. 10 in the method described in the second embodiment. Control device 110 calculates an angle (hereinafter referred to as an "operation surficial angle") formed by the calculated vertically downward vector and a perpendicular line of a surface that is extended in X-axis direction and Y-axis direction (namely, a surface parallel to operation surface 221). When the calculated operation surficial angle is smaller than or equal to a threshold (e.g., 45 degrees), control device 110 determines that operation surface 221 faces in a horizontal direction (namely, operation surface 221 is closer to a vertical plane than a horizontal plane; in other words, the attitude of terminal 10 is in an "upright" state rather than in a "recumbent" state). Thus, a state in which operation surface 221 faces in the horizontal plane means not only a state in which operation surface 221 is perfectly parallel to the vertical plane, but also a state in which an angle of operation surface 221 with respect to the vertical plane is within a predetermined angular range. Determination unit 104 notifies transition unit 103 of a result of the determination.

Transition unit 103 performs the transition using the method described in the third embodiment when the second direction detected by first detection unit 101 is the vertically downward direction, and when determination unit 104 determines that the terminal surface (in the present embodiment, operation surface 221) faces in the vertical direction (this case is hereinafter referred to as a "first case"). Otherwise, transition unit 103 performs the transition in the method as described in the first embodiment (this case is hereinafter referred to as a "second case"). The second case is namely a case where the second direction detected by first detection unit 101 is not the vertically downward direction, or where determination unit 104 determines that the terminal surface does not face in the vertical direction. Specifically, in the first case, transition unit 103 performs the transition when there is a relation that the second direction detected by first detection unit 101 is the vertically downward direction, and that the second change direction having a mean of decreasing surrounding brightness is detected by second detection unit 102. In the second case, transition unit 103 performs the transition when the first direction detected by first detection unit 101 and the first change direction (the above object-moving direction) detected by second detection unit 102 have a relation that one direction and a component of another direction along a line of the one direction are oppositely directed.

Portable terminal 10 executes the automatic lock processing under the above configuration.

Figure 16:
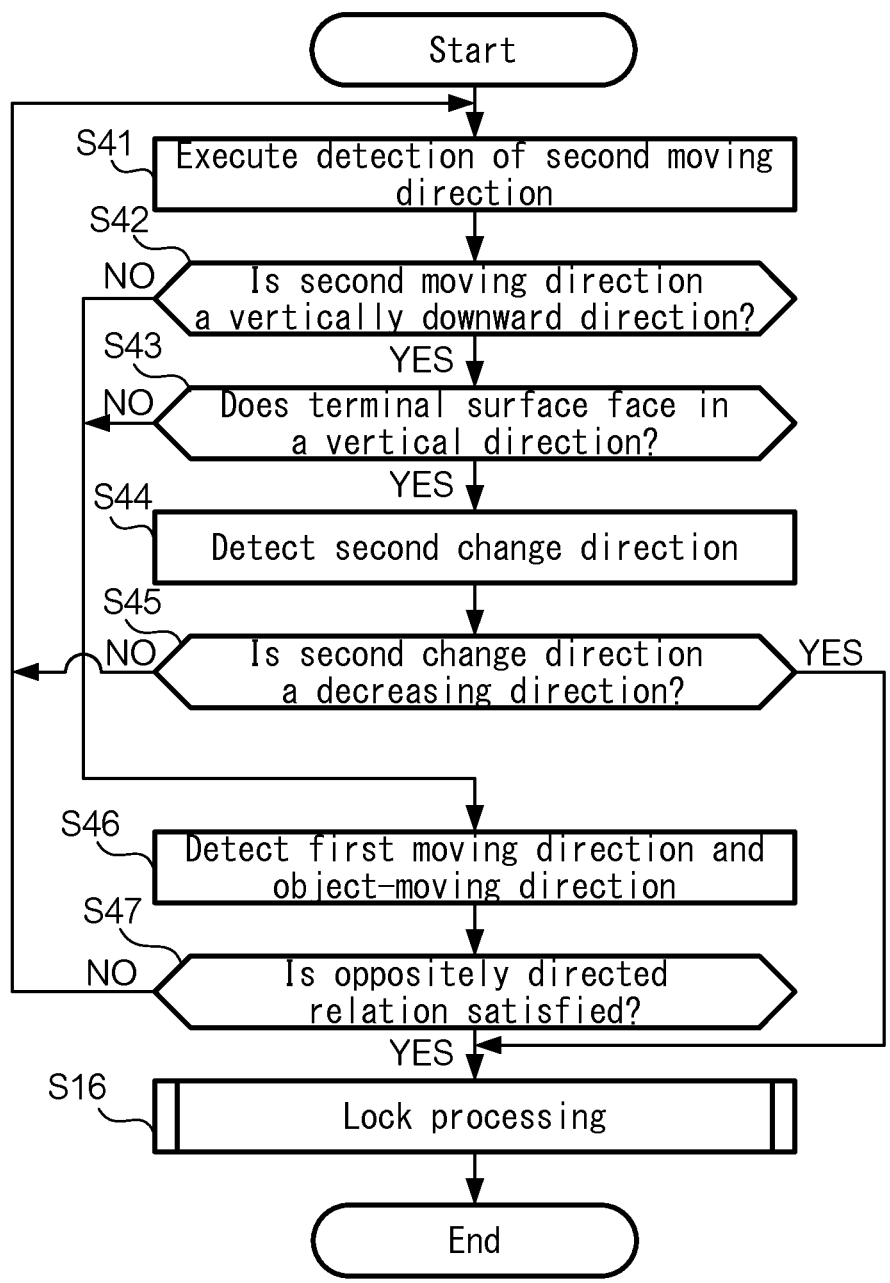
FIG. 16 is a flowchart showing an example of an operation in an automatic lock processing.

FIG. 16 is a flowchart showing an example of an operation performed in an automatic lock processing of the present embodiment by portable terminal 10b. Portable terminal 10b firstly executes the detection of the second direction (step S41). Step S41 is an operation performed by first detection unit 101 shown in FIG. 15. Portable terminal 10b then determines whether the detected second direction is the vertically downward direction (step S42). If it is determined that the second direction is not the vertically downward direction (step S42: NO), portable terminal 10b proceeds to step S46, which is described later, to perform an operation of step S46. Meanwhile, if it is determined that the second direction is the vertically downward direction (step S42: YES), portable terminal 10b determines whether the terminal surface (in the present embodiment, operation surface 221) faces in a direction parallel to the vertical surface (step S43). Step S43 in this example is an operation performed by determination unit 104.

If it is determined that the terminal surface faces in the vertical direction (YES) in step S43, portable terminal 10b detects the above second change direction (step S44). Portable terminal 10b determines whether the detected second change direction is the decreasing direction (step S45). In this case, portable terminal 10b determines whether the change direction of brightness surrounding the terminal (the second change direction) is a direction in which brightness decreases (the decreasing direction). If it is determined that the change direction of brightness is not the decreasing direction (step S45: NO), portable terminal 10b returns to step S41 to perform the operation of step S41. Meanwhile, if it is determined that the change direction of brightness is the decreasing direction (step S45: YES), portable terminal 10b proceeds to step S16 to perform the lock processing. In this example, since it has already been determined that the second direction is the vertically downward direction in step S42, the determination of step S45 that the change direction of brightness is the decreasing direction means that portable terminal 10b is in the first case, which is described with reference to FIG. 15. Step S44 is an operation performed by second detection unit 102. Steps S45 and S16 in this example are operations performed by transition unit 103.

Meanwhile, if it is determined that the terminal surface does not face in the vertical direction (NO) in step S43, portable terminal 10b detects the above first direction and the above object-moving direction (the first change direction) (step S46). Portable terminal 10b also performs the operation of step S46 when the determination of step S42 is "NO" as described above. In other words, portable terminal 10b performs the operation of step S46 when the detected second direction is not the vertically downward direction, or when it is determined that the terminal surface does not face in the vertical direction; namely, in the above second case. Portable terminal 10b then determines that the oppositely directed relation is satisfied based on the first direction and the object-moving direction that are detected in step S46 (step S47). In this case, portable terminal 10b determines whether a direction (the first direction) in which the terminal moves along the terminal surface (in this example, operation surface 221) and the above object-moving direction (the first change direction) have the oppositely directed relation. If it is determined that the oppositely directed relation is not satisfied (step S47: NO), portable terminal 10b returns to step S41 to perform the operation of step S41. Meanwhile, if it is determined that the oppositely directed relation is satisfied (step S47: YES), portable terminal 10b proceeds to step S16 to perform the lock processing. Step S46 is an operation performed by first detection unit 101 and second detection unit 102. Steps S47 and S16 in this example are operations performed by transition unit 103.

Although an example in which portable terminal 10b selectively uses the method described in the first embodiment and the method described in the third method, is described with reference to FIGS. 15 and 16, portable terminal 10b may selectively use the method described in the second embodiment and the method described in the third method in a similar manner.

When the storage space is, for example, a bag, there is a possibility that the portable terminal cannot measure the height from the sensor position, and as a result the object-moving direction is not detected, as described with reference to FIG. 14. Even if the object-moving direction is detected, the oppositely directed relation may not be satisfied.

Figure 17:
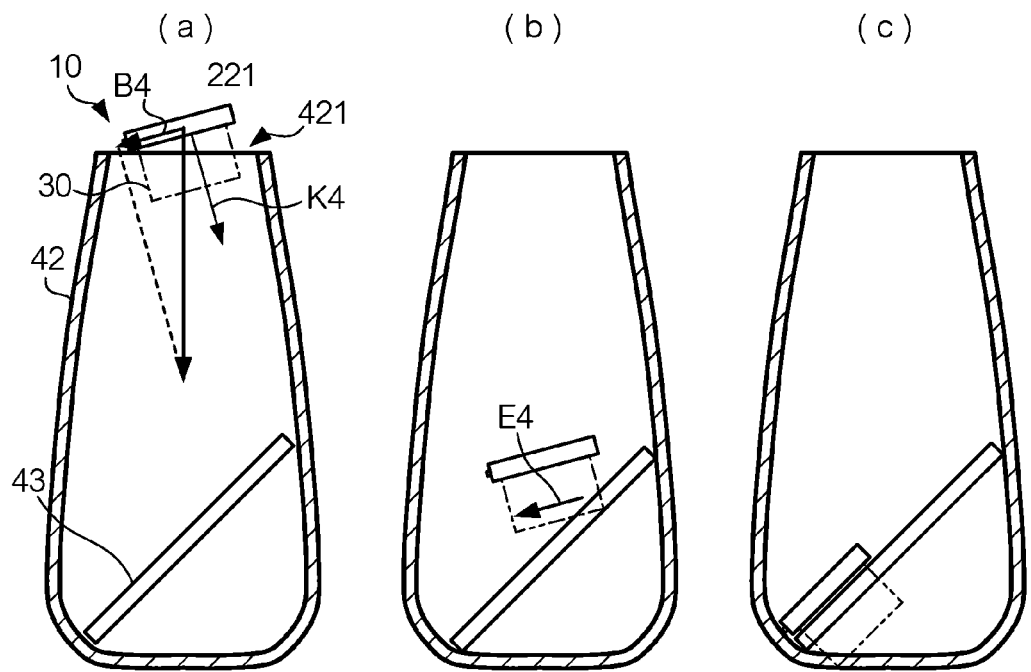
FIG. 17 is a diagram showing an example of a portable terminal stored in a bag.

FIG. 17 is a diagram showing an example of portable terminal 10 stored in bag 42 shown in FIG. 14. In this example, object 43 is stored inside bag 42. As shown in FIG. 17(a), portable terminal 10 falls from opening 421 to the inside of bag 42 in the vertically downward direction and is stored in bag 42 in an attitude such that operation surface 221 faces in such a direction (a direction indicated by arrow K4) that a normal vector of operation surface 221 is at an angle (about fifteen degrees) to the vertical direction. In this case, the direction indicated by arrow K4 is detected as a direction in which portable terminal 10 moves along operation surface 221 (namely, the first direction).

Portable terminal 10 makes contact with stored object 43 during falling as shown in FIG. 17(b), and moves to the bottom of bag 42 as shown in FIG. 17(c). In this case, the direction indicated by arrow E4 is detected as the object-moving direction during a period from when portable terminal 10 approaches stored object 43 to when operation surface 221 makes contact with stored object 43. In this example, detected first direction of B4 and object-moving direction of E4 do not have the oppositely directed relation. In this way, the oppositely directed relation may not be satisfied when portable terminal 10 is stored in bag 42, depending on a shape of the stored object, a storage state, and an attitude of portable terminal 10.

Meanwhile, even if the portable terminal is stored in bag 42 in the same manner, there is a case that the oppositely directed relation is likely to be satisfied depending on an attitude of the portable terminal.

Figure 18:
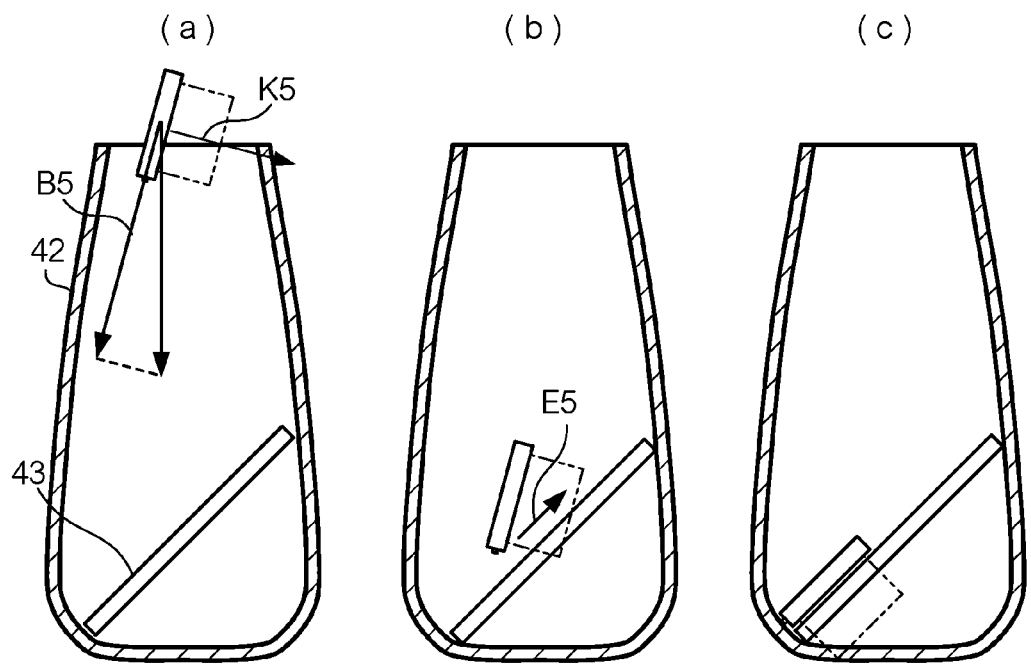
FIG. 18 is a diagram showing an example of a portable terminal stored in a bag.

FIG. 18 is a diagram showing another example of portable terminal 10 stored in bag 42 shown in FIG. 14. In this example, object 43 is stored inside bag 42, similarly to the example of FIG. 17. As shown in FIG. 18(a), portable terminal 10 falls from opening 421 to the inside of bag 42 in the vertically downward direction and is stored in bag 42 in an attitude such that operation surface 221 faces in such a direction (a direction indicated by arrow K5) that an operation surface 221 is at an angle (about seventy-five degrees) to the vertically downward direction. In this case, the direction indicated by arrow B5 is detected as the first direction. Portable terminal 10 makes contact with stored object 43 during falling as shown in FIG. 18(b), and moves to the bottom of bag 42 as shown in FIG. 18(c). In this case, the direction indicated by arrow B5 is detected as the object-moving direction during a period from when portable terminal 10 approaches stored object 43 to when operation surface 221 makes contact with stored object 43. In this example, detected first direction of B5 and object-moving direction of E5 have the oppositely directed relation.

When the portable terminal is stored in a bag, the portable terminal is often stored while falling in the vertically downward direction as shown in FIG. 14, etc. In other words, a direction of movement of the portable terminal tends to be the vertically downward direction. In addition, as the direction of movement of the portable terminal and the terminal surface (in this example, operation surface 221) are nearly parallel to each other, an object (in this example, object 43) located at a destination of the movement is more likely to intrude into measurement space 30 from the forward end of measurement space 30 in a direction parallel to the terminal surface. As a result, the oppositely directed relation is likely to be satisfied as shown in FIG. 18. In contrast, as the direction of movement of the portable terminal and a normal direction of the terminal surface (in this example, operation surface 221) are nearly parallel to each other, there is an increased possibility of a case where the oppositely directed relation is not satisfied depending on the state of the stored object, etc. as shown in FIG. 17, or a case where the object-moving direction is not detected as shown in FIG. 14.

The above first case (namely, a case where the second direction is the vertically downward direction and where it is determined that the terminal surface faces in the vertical direction) represents a case where the vertically downward direction, in which the portable terminal moves, and the terminal surface are nearly perpendicular to each other as shown in FIGS. 14 and 17. The second case other than the first case represents a case where the vertically downward direction, in which the portable terminal moves, and the terminal surface are nearly parallel to each other as shown in FIG. 18. In the present embodiment, in the first case, it is determined whether the state of the portable terminal is transitioned in the method described in the third embodiment without using the oppositely directed relation. In the second case, it is determined whether the state of the portable terminal is transitioned in the method described in the first embodiment (or the second embodiment) using the oppositely directed relation. According to the present embodiment, even in a case of decreasing accuracy of the determination that the terminal is stored based on the first direction and the first change direction as shown in FIGS. 14 and 17, it is possible to increase accuracy of this determination by using the second direction and the second change direction.

Modification

The above embodiments merely describe exemplary modes of the present invention. The embodiments may be modified as described below. The above embodiments and the following modifications may be combined and be carried out as necessary.

Modification 1

Although the touch sensor is the electric capacitive sensor in the above embodiments, the touch sensor may be another sensor. For example, the touch sensor may be a sensor such as an infrared reflective sensor, an electromagnetic induction sensor, and an image recognition sensor. Since these sensors are able to detect the pointer without making contact with the operation surface, the sensors are able to detect the height from the sensor position similarly to the electric capacitive sensor. It is to be noted that a sensor that is not capable of measuring the height from the sensor position (e.g., a resistance film sensor, a surface acoustic wave sensor, and an infrared shielding sensor) may be used together with these sensors. To summarize, any type of touch sensor may be used as long as it is configured to be able to measure the height from the sensor position.

Modification 2

In the above embodiments, the portable terminal performs various processings and operations using operation surface 221 shown in FIG. 2 as the terminal surface; namely, a surface included in the terminal. However, the portable terminal may use a surface other than the operation surface as a reference surface that is used for representing an attitude of the portable terminal. For example, the portable terminal may use a reverse side of the operation surface as the terminal surface. Alternatively, the portable terminal may use, as the terminal surface, a side that is located at the right side or left side of the operation surface, or the top side or the bottom side that is located at the top or bottom of the operation surface. In these cases, portable terminal may include, on the surface used as the terminal surface, an electric capacitive sensor such as touch sensor 220, or another sensor described in the above modification. To summarize, the portable terminal only needs to include a sensor so as to be able to measure the height from the sensor position on the terminal surface.

Modification 3

In the above embodiments, transition unit 103 performs the transition when the oppositely directed relation, which is described with reference to FIG. 8, is satisfied. However, transition unit 103 may prevent the transition from being performed when a predetermined condition is satisfied even if the oppositely directed relation is satisfied. For example, transition unit 103 may prevent the transition from being performed when a speed at which the terminal moves in the first direction is smaller than a predetermined speed.

Figure 19:
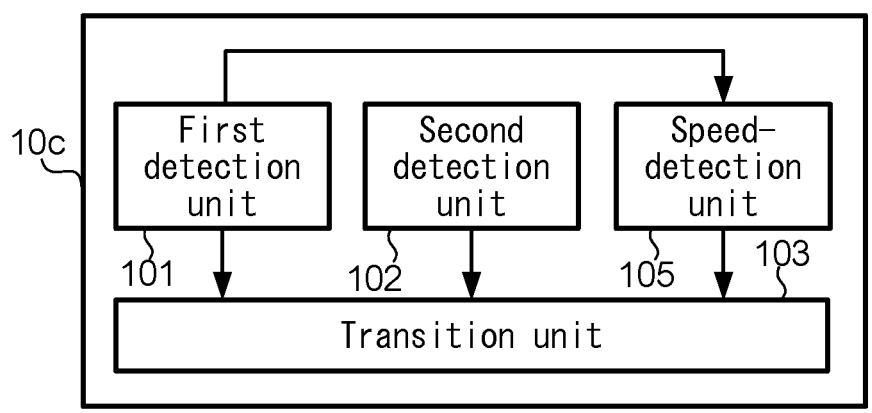
FIG. 19 is a block diagram showing a functional configuration of a portable terminal.

FIG. 19 is a block diagram showing a functional configuration of portable terminal 10c of the present modification. Portable terminal 10c includes a hardware configuration similar to that of portable terminal 10 shown in FIG. 1. Portable terminal 10c also includes speed-detection unit 105 in addition to the functions shown in FIG. 3. When the first direction (a direction in which the terminal moves along the terminal surface) is detected, first detection unit 101 notifies speed-detection unit 105 of a result of the detection.

Speed-detection unit 105 is a speed-detection means for detecting a speed at which the terminal moves in the first direction that is detected by first detection unit 101 (hereinafter referred to as a "terminal moving speed"). Speed-detection unit 105 is a function implemented by cooperation of control device 110 with accelerometer 160 shown in FIG. 1, similarly to first detection unit 101. Speed-detection unit 105 calculates the surficial velocity vector, which is described with reference to FIG. 4, in a similar way to first detection unit 101, and thereby speed-detection unit 105 detects a length of the calculated surficial velocity vector as the terminal-moving speed. Speed-detection unit 105 notifies transition unit 103 of the detected terminal-moving speed. Transition unit 103 prevents the above transition (the transition of the state of the terminal) from being performed when speed-detection unit 105 detects a speed smaller than the predetermined speed, while the oppositely directed relation is satisfied between the first direction and the first change direction.

Figure 20:
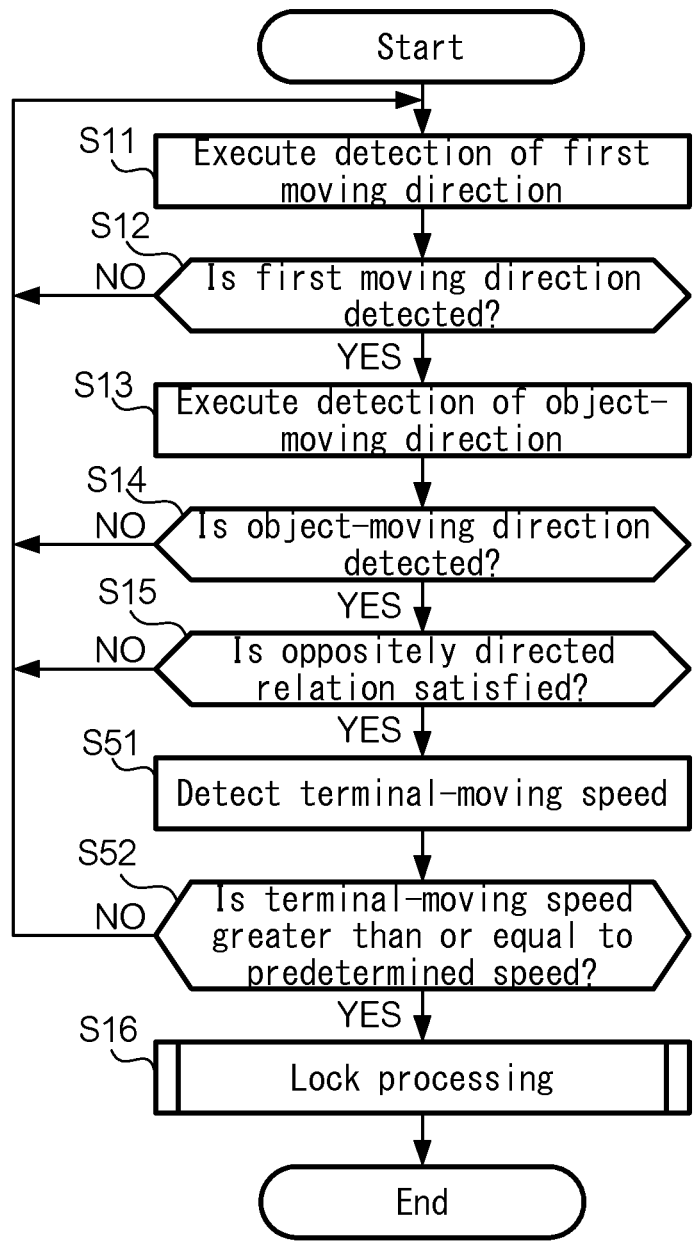
FIG. 20 is a flowchart showing an example of an operation in an automatic lock processing.

FIG. 20 is a flowchart showing an example of an operation performed in an automatic lock processing of the present modification by portable terminal 10c. Portable terminal 10c performs the same operations as those of step S11 to step S15 shown in FIG. 9. If it is determined that the oppositely directed relation is satisfied (YES) in step S15, portable terminal 10c detects the terminal-moving speed (step S51). In this example, steps S14, S15, and S51 are operations performed by speed-detection unit 105. Portable terminal 10c then determines whether the detected terminal-moving speed is greater than or equal to the predetermined speed (step S52). If it is determined that the terminal-moving speed is not greater than or equal to the predetermined speed; namely, the terminal-moving speed is smaller than the predetermined speed (step S52: NO), portable terminal 10c returns to step S11 to perform the operation of step S11, without performing the lock processing. Meanwhile, if it is determined that the terminal-moving speed is greater than or equal to the predetermined speed (step S52: YES), portable terminal 10c proceeds to step S16 to perform the lock processing. It is to be noted that portable terminal 10c may perform the operation of step S51 in parallel with steps S11 and S13.

Some portable terminals include an IC (Integrated Circuit) chip to allow the user to perform the payment of a fee by holding the portable terminal over a predetermined reader. When the IC chip is provided on the terminal surface, the user holds the portable terminal over the reader such that the terminal surface faces the reader. As a result, the first direction and the object-moving direction may be detected, and also the above oppositely directed relation may be satisfied. Further, to ensure the reading, the user often moves the portable terminal as slowly as possible to a position close to the reader. The user also often brings the portable terminal close to the reader while the terminal surface faces the reader. On the other hand, when the user stores the portable terminal in the storage space such as a pocket, the user often accelerates the portable terminal in a direction, in which the portable terminal is stored, to push the portable terminal into the storage space while holding the portable terminal, or often allows the portable terminal to fall by releasing a grip on the portable terminal. Thus, when the portable terminal is held over the reader, a speed in the first direction, namely the terminal-moving speed, is more likely to increase, compared with a case where the portable terminal is stored. When a value between average values, each being an average of the terminal-moving speeds detected in each of these cases, is set to the predetermined speed, even if the oppositely directed relation is satisfied when the portable terminal is held over the reader, a speed smaller than the predetermined speed is detected during that time. According to the present modification, the transition is prevented from being performed when such a speed is detected. Therefore, compared with a case where the transition is performed even if such a speed is detected, a problem rarely occurs that the state of the terminal is transitioned, for example, when the user performs an action to hold the portable terminal over the reader, in spite of a fact that the portable terminal is not stored in the storage space.

Modification 4

Transition unit 103 may prevent the transition from being performed, for example, in a case where an area of the object-facing region, which is described with reference to FIG. 6, etc., changes so as to decrease, using this case as the case where the predetermined condition described in the above modification is satisfied.

Figure 21:
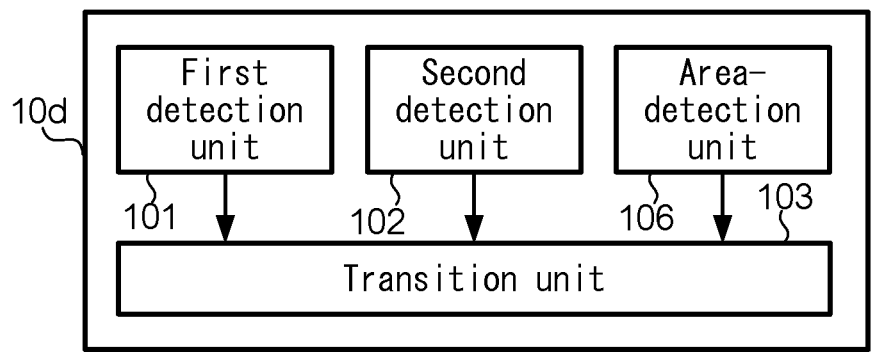
FIG. 21 is a block diagram showing a functional configuration of a portable terminal.

FIG. 21 is a block diagram showing a functional configuration of portable terminal 10d of the present modification. Portable terminal 10d includes a hardware configuration similar to that of portable terminal 10 shown in FIG. 1. Portable terminal 10d also includes area-detection unit 106 in addition to the functions shown in FIG. 3. Area-detection unit 106 is an area-detection means for detecting an area of a region (namely the object-facing region shown in FIG. 6), on operation surface 221, facing an object located in a direction in which the terminal surface faces. Area-detection unit 106 is a function implemented by cooperation of control device 110 with touch sensor 220, similarly to second detection unit 102. Specifically, area-detection unit 106 detects the area of the object-facing region in the manner described below.

Control device 110 specifies the object-facing region based on the sensor position and the height from the sensor position that are represented by data provided from touch sensor 220 in the way used by second detection unit 102 in the first embodiment. For example, control device 110 extracts all combinations of three sensor positions, from among a plurality of sensor positions included in the specified object-facing region, forming a triangle that includes no other sensor position inside. Control device 110 calculates areas of all triangles formed by the extracted combinations. Control device 110 detects the sum of the areas calculated in this way as the area of the object-facing region. Area-detection unit 106 detects the area of the object-facing region as described above, and notifies transition unit 103 of the detected area.

Transition unit 103 does not perform the above transition when the area detected by area-detection unit 106 changes so as to decrease while the oppositely directed relation is satisfied between the first direction and the first change direction.

Portable terminal 10d executes the above automatic lock processing under the above configuration. In this case, portable terminal 10d detects the area of the object-facing region in step S51 shown in FIG. 20 (this operation is performed by area-detection unit 106), instead of detecting the terminal-moving speed. In step S52, portable terminal 10d determines whether the detected area changes so as to decrease while the oppositely directed relation is satisfied between the first direction and the first change direction. This causes the automatic lock processing of the present modification to be executed.

When the portable terminal is stored in pocket 41 as shown in FIG. 5, the area of the object-facing region does not decrease in the middle because cloth 412 of pocket 41 gradually covers operation surface 221, and cloth 412 covers the whole of operation surface 221 at the end. When the pocket has a depth smaller than a size of the portable terminal, the portable terminal protrudes from the pocket. Even in this case, the area of the object-facing region does not decrease in the middle although the area of the object-facing region fails to reach an area of the whole of operation surface 221. However, when an object that is not a part of the storage space passes over operation surface 221, the area of the object-facing region decreases.

Figure 22:
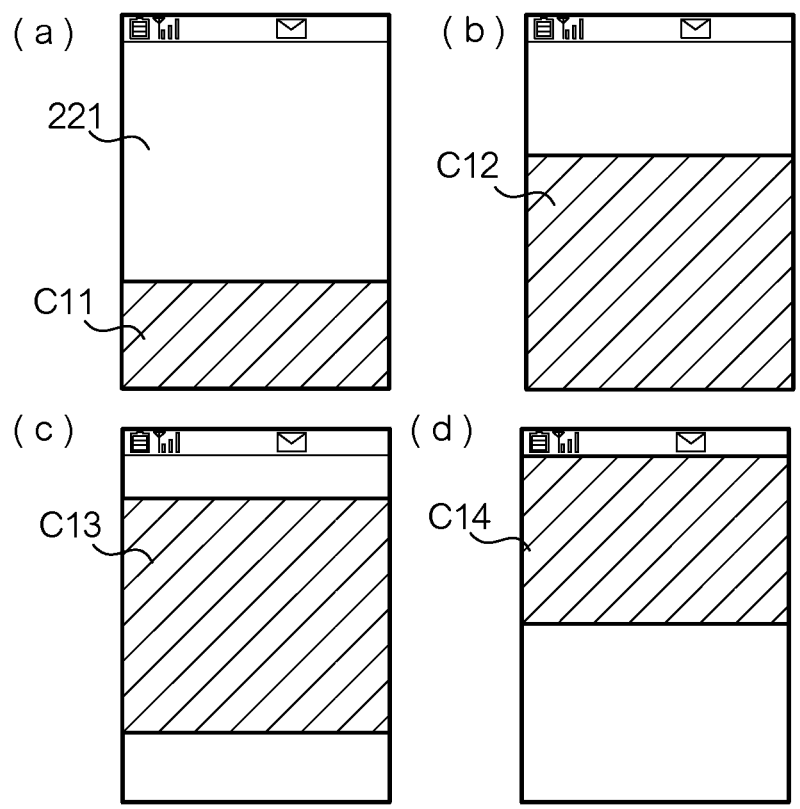
FIG. 22 is a diagram showing an example of an object-facing region specified by a second detection unit.

FIG. 22 is a diagram showing an example of the change of an object-facing region. FIGS. 22(*a*), 22(*b*), 22(*c*), and 22(*d*) show object-facing regions C11, C12, C13, and C14 when an object (e.g., a palm of the user's hand) passes over operation surface 221 from the bottom to the top. In this example, when the object-facing region changes from C11 to C12, the area of the object-facing region increases. However, when the object-facing region changes from C12 to C13, the area of the object-facing region is the same. When the object-facing region changes from C13 to C14, the area of the object-facing region decreases. Even in this case, the oppositely directed relation is satisfied if the first direction is the downward direction of the up-down direction. In this way, for example, when the user performs an action to pass the palm of the user's hand over the terminal surface, the state of the portable terminal may be transitioned in spite of a fact that the portable terminal is not stored in the storage space. On the other hand, as described above, if an object is a part of the storage space, the area of the object-facing region does not decrease in this way. In the present modification, transition unit 103 prevents the transition from being performed when the area of the object-facing region decreases as described above. Compared with a case where the transition is performed even in this case, a problem rarely occurs that the state of the terminal is transitioned depending on the above user's action or the like, in spite of a fact that the portable terminal is not stored in the storage space.

Modification 5

Transition unit 103 may prevent the transition from being performed, for example, in a case where a distance between the object and the terminal surface is greater than or equal to a threshold, using this case as the case where the predetermined condition described in the above modification is satisfied.

Figure 23:
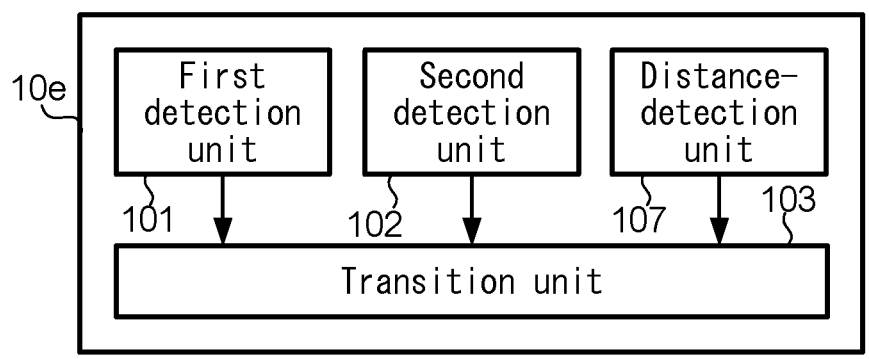
FIG. 23 is a block diagram showing a functional configuration of a portable terminal.

FIG. 23 is a block diagram showing a functional configuration of portable terminal 10e of the present modification. Portable terminal 10e includes a hardware configuration similar to that of portable terminal 10 shown in FIG. 1. Portable terminal 10e also includes distance-detection unit 107 in addition to the functions shown in FIG. 3. Distance-detection unit 107 is a distance-detection means for detecting a distance (referred to as an "object distance") between an object located in a direction, in which the terminal surface faces, and the terminal surface. Distance-detection unit 107 is a function implemented by cooperation of control device 110 with touch sensor 220, similarly to second detection unit 102. Specifically, distance-detection unit 107 detects the object distance in the manner described below.

Control device 110 extracts the maximum height from the sensor position, from among the heights from the sensor position represented by data provided from touch sensor 220. Control device 110 detects the extracted height from the sensor position as the above object distance. Distance-detection unit 107 detects the object distance in this way, and notifies transition unit 103 of the detected object distance. When the object distance detected by distance-detection unit 107 is greater than or equal to the threshold, transition unit 103 does not perform the above transition even if the oppositely directed relation is satisfied between the first direction and the first change direction.

Portable terminal 10e executes the above automatic lock processing under the above configuration. In this case, portable terminal 10e detects the object distance in step S51 shown in FIG. 20 (this operation is performed by distance-detection unit 107), instead of detecting the terminal-moving speed. In step S52, portable terminal 10e determines whether the detected object distance is greater than or equal to the threshold. This causes the automatic lock processing of the present modification to be executed. Portable terminal 10e performs operations of steps S51 and S52, spending a predetermined time (e.g., two seconds). This prevents the state from being transitioned until the predetermined time passes after the oppositely directed relation is satisfied in step S15.

After the user brings the portable terminal to, for example, the opening of the breast pocket when about to insert the portable terminal into the breast pocket, the user may decide after all to use the portable terminal instead of storing the portable terminal. In this case, when the terminal surface faces the user, the oppositely directed relation is satisfied as described with reference to FIG. 7, and the state is transitioned by the user merely bringing the portable terminal to the opening of the breast pocket. In the present modification, if the user brings the portable terminal to separate it from the cloth 411 of the main part of the shirt by a distance greater than or equal to the threshold in the above predetermined time after the oppositely directed relation is satisfied in step S15, the object distance is greater than or equal to the threshold, and as a result the transition is not performed. In this way, according to the present modification, it is possible to maintain the first state (the operation-reception state in the above embodiments) without the state of the portable terminal being transitioned, by the user moving the portable terminal, even after the oppositely directed relation is satisfied between the first direction and the first change direction while the portable terminal is being stored.

Modification 6

Transition unit 103 may prevent the transition from being performed, for example, in a case where a program for receiving an operation that is likely to satisfy the oppositely directed relation, is being executed, using this case as the case where the predetermined condition described in the above modification is satisfied.

Figure 24:
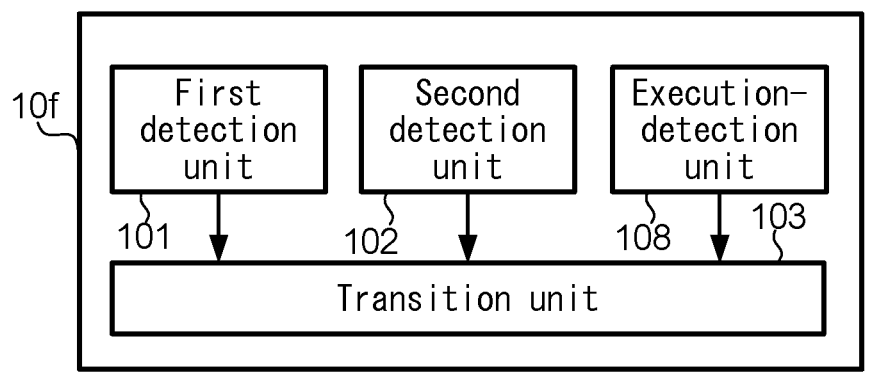
FIG. 24 is a block diagram showing a functional configuration of a portable terminal.

FIG. 24 is a block diagram showing a functional configuration of portable terminal 10f of the present modification. Portable terminal 10f includes a hardware configuration similar to that of portable terminal 10 shown in FIG. 1. Portable terminal 10f also includes execution-detection unit 108 in addition to the functions shown in FIG. 3. Execution-detection unit 108 is an execution-detection means for detecting that a predetermined program is being executed. The predetermined program referred to here is a program that is predetermined as a program for receiving the operation that is likely to satisfy the oppositely directed relation as described above. For example, this kind of program includes a program of a game in which the user operates operation surface 221 while moving portable terminal 10f. Execution-detection unit 108 is a function implemented by cooperation of control device 110 with storage device 120. Specifically, execution-detection unit 108 performs this detection in a way described below.

Storage device 120 stores in advance a list in which the above program is registered. When a program is executed, control device 110 checks whether the program is registered in the list. If the program is registered in the list, control device 110 notifies transition unit 103 that the condition is satisfied. If execution-detection unit 108 detects the execution of the predetermined program, transition unit 103 does not perform the above transition even if the oppositely directed relation is satisfied between the first direction and the first change direction.

Portable terminal 10f executes the above automatic lock processing under the above configuration. In this case, portable terminal 10f detects the execution of the predetermined program in step S51 shown in FIG. 20 (this operation is performed by execution-detection unit 108), instead of detecting the terminal-moving speed. In step S52, portable terminal 10f determines whether the execution is detected. This causes the automatic lock processing of the present modification to be executed.

When the program registered in the above list is being executed, the user may perform an operation using operation surface 221 while moving portable terminal 10f itself, for example. Thus, the oppositely directed relation may be satisfied regardless of whether portable terminal 10f is stored. In the present modification, the transition is not performed when the execution of the above program is detected even if the oppositely directed relation is satisfied. Thus, compared with a case where the transition is performed even in this case, a problem rarely occurs that the state of the terminal is transitioned in spite of a fact that the portable terminal is not stored in the storage space.

It is to be noted that the portable terminal may store a history of a program being executed when the above transition is performed, and may register a program in the list when a ratio, of a number of times of the transition while the program is being executed to a number of times the program is executed, exceeds a threshold (e.g., 80%), even if the program is not registered in the list in advance. These storage and registration operations are performed by cooperation of control device 110 with storage device 120. This allows a program for receiving an operation that is likely to satisfy the oppositely directed relation to be registered in the list when the program is not registered in the list in advance. As a result, compared with a case where this registration is not performed, a problem rarely occurs that the state of the terminal is transitioned in spite of a fact that the portable terminal is not stored in the storage space.

Modification 7

Although second detection unit 102 detects brightness as the change direction in the above modification, second detection unit 102 may detect another change direction such as volume of a sound or wind strength. These physical quantities may change before and after the portable terminal is stored in the storage space. For example, the volume of a sound and the wind strength often decrease after the portable terminal is stored compared with those at a time before the portable terminal is stored. Second detection unit 102 detects this change direction, and notifies transition unit 103 of a result of the detection. In a case where the change direction of the volume of a sound or the wind strength is detected, transition unit 103 transitions the state of the terminal when the change direction detected by second detection unit 102 changes so as to decrease, and when the second direction detected by first detection unit 101 is the vertically downward direction, similarly to a case where brightness is detected.

Alternatively, second detection unit 102 may detect a plurality of change directions from the above change directions (the brightness, the volume of a sound, and the wind strength). In this case, transition unit 103 performs the transition when at least one of the detected change directions makes the above change, and when the second direction is the vertically downward direction. These change directions may hardly change before and after the portable terminal is stored, depending on a surrounding condition. For example, in a condition where the area surrounding the portable terminal becomes dark, such as at night, brightness may not be different before and after the portable terminal is stored. According to the present modification, it is possible to determine whether the portable terminal is stored based on the change of another change direction in this case. Thus, it is possible to increase accuracy of this determination compared with a case where only a single change direction is detected.

Modification 8

In the above embodiments, first detection unit 101 calculates a velocity at which the terminal moves along operation surface 221 based on an amount of the change in acceleration of the terminal, and detects the first direction using the calculated velocity. However, first detection unit 101 may detect the first direction in another manner. For example, first detection unit 101 calculates a vector indicating acceleration at which the terminal moves along the terminal operation surface 221, namely a vector (hereinafter referred to as a "surficial acceleration vector") that is the sum of vectors representing an amount of the change in the detected acceleration in X-axis direction and Y-axis direction when acceleration of the terminal changes. First detection unit 101 detects a direction indicated by the calculated surface-acceleration vector as the first direction.

When the portable terminal is stored in a pocket or the like, namely after the portable terminal is transitioned to a state in which the object-facing region is specified as shown in FIG. 5(b) or FIG. 7(b), from a state in which the object-facing region is not specified as shown in FIG. 5(a) or FIG. 7(a), the portable terminal often moves approximately straight in a single direction. When the portable terminal moves in a straight direction in this way, a direction of acceleration of the portable terminal is equal to a direction of the movement of the portable terminal. Thus, the calculated surficial acceleration vector indicates a direction in which the terminal moves along operation surface 221. In this case, the portable terminal does not have to integrate acceleration. Thus, it is possible to detect the first direction in a short time compared with a case where the surficial velocity vector is calculated.

In addition, even if the user is moving on a vehicle such as a train, using an escalator, or on foot, only acceleration of gravity is calculated as long as a velocity of the movement and a direction of the movement are kept constant. This means that the above surficial acceleration vector indicates a direction in which the portable terminal to be stored moves along operation surface 221 regardless of the movement of the user. Thus, according to the present modification, it is possible to facilitate the detection of the first direction even if the portable terminal moves together with the user.

Modification 9

Although the portable terminal includes the accelerometer in the above embodiments, the portable terminal may include an angular velocity sensor or a geomagnetic sensor in addition to the accelerometer. The inclusion of the angular velocity sensor allows the portable terminal, when an inclination of the terminal with respect to the vertical direction changes, to reflect the change of the inclination with respect to the vertical direction in a short time, compared with a case where the portable terminal includes only the accelerometer. As a result, it is possible to increase accuracy of the surficial velocity vector or the vertically downward vector to be calculated. The inclusion of the geomagnetic sensor allows the portable terminal to detect the vertical direction even when the terminal moves or turns. As a result, it is possible to increase accuracy of the surficial velocity vector or surficial velocity vector to be calculated compared with a case where only the accelerometer is used.

Modification 10

In the above embodiments, transition unit 103 transitions the state of the terminal from the operation-reception state, which is the first state, to the lock state, which is the second state. However, transition unit 103 may transition the state from or to another state. For example, although transition unit 103 prevents supply of electric power to touch sensor 220 in the second state, namely the lock state, transition unit 103 may prevent supply of electric power to display device 210 while supplying electric power to touch sensor 220. In this case, the portable terminal transitions to a state in which no image is displayed, namely sleep state. Alternatively, transition unit 103 may prevent supply of electric power to both display device 210 and touch sensor 220, or may prevent supply of electric power to another device as well. Alternatively, transition unit 103 may prevent supply of electric power to some devices in the first state, instead of preventing supply of electric power to all devices. Alternatively, transition unit 103 may restrict a processing that is able to be executed in the second state compared with that of the first state, or may simply decrease brightness of a screen, regardless of the power supply to the devices. To summarize, transition unit 103 only needs to transition the state of the terminal to the second state in which power consumption is smaller than that of the first state.

Modification 11

The present invention may be understood not only as the above portable terminal, but also as a stop method for implementing a processing executed in the portable terminal. The processing referred to here is, for example, the automatic lock processing shown in FIG. 9, FIG. 11, etc. The present invention may be understood as a program that causes a computer such as the portable terminal to serve as the means shown in FIGS. 3, 10, 52, 62, and 12. This program may be provided by being stored in a recording medium such as an optical disk, or may be provided by being downloaded to the computer via a network such as the Internet and by being installed into the computer so as to be available.

What is claimed is:

1. A portable terminal comprising:
    a first detection unit that detects a change in a position of the portable terminal;
    a second detection unit that detects a change in a physical quantity representing a surrounding condition of the portable terminal; and
    a transition unit that causes the portable terminal to transition from a first state to a second state in which electricity consumption is smaller than that of the first state, upon a relation between a direction of the change detected by the first detection unit and a trend in the change in the physical quantity detected by the second detection unit satisfying a predetermined condition, wherein:
    the second detection unit detects a change in a relative position of an object with respect to an operation surface, the object being located in a direction in which the operation surface faces; and
    the transition unit performs a transition upon an opposite relation being satisfied between a component of the direction of the change detected by the first detection unit, the component being parallel to the operation surface of the portable terminal, and the trend in the change detected by the second detection unit.

2. The portable terminal according to claim 1, wherein the transition unit performs the transition upon the opposite relation being satisfied, and upon the direction of the change detected by the first detection unit being a downward direction.

3. The portable terminal according to claim 1, further comprising a speed-detection unit that detects a speed at which the portable terminal moves in the direction of the change detected by the first detection unit, and wherein:
    the transition unit prevents the transition from being performed upon the speed-detection unit detecting a speed smaller than a predetermined speed while the opposite relation is satisfied.

4. The portable terminal according to claim 1, further comprising an area-detection unit that detects an area of a portion on the operation surface, the portion facing the object, the object being located in the direction in which the operation surface faces, and wherein
    the transition unit prevents the transition from being performed upon the area detected by the area-detection unit changing so as to decrease while the opposite relation is satisfied.

5. The portable terminal according to claim 1, further comprising a distance-detection unit that detects a distance between the object and the operation surface, and wherein
    the transition unit prevents the transition from being performed upon the distance detected by the distance-detection unit being greater than or equal to a threshold even if the opposite relation is satisfied.

6. The portable terminal according to claim 1, wherein:
    the physical quantity represents at least one of brightness, volume of a sound, and wind strength surrounding the portable terminal; and
    the transition unit performs a transition upon the direction of the change detected by the first detection unit being a downward direction and upon the physical quantity detected by the second detection unit decreasing.

7. The portable terminal according to claim 1 further comprising a determination unit that determines a direction in which an operation surface faces, wherein:
    the physical quantity represents at least one of brightness, volume of a sound, and wind strength surrounding the portable terminal;
    the transition unit performs a transition upon a first condition being satisfied in which the direction of the change detected by the first detection unit is a downward direction, and in which an angle formed between the direction of the operation surface determined by the determination unit and a horizontal plane is included in a predetermined range, and upon a decrease of the physical quantity being detected, and
    the transition unit performs a transition upon the first condition being not satisfied, and upon an opposite relation being satisfied between the direction of the change detected by the first detection unit and a direction of the change detected by the second detection unit.

8. A method of operating a portable terminal, the method comprising the steps of:
    detecting, with a first detecting unit, a change in a position of the portable terminal;
    detecting, with a second detecting unit, a change in a physical quantity representing a surrounding condition of the portable terminal; and
    causing, with a transition unit, the portable terminal to transition from a first state to a second state in which electricity consumption is smaller than that of the first state, upon a relation between a direction of the change detected by the first detection unit and a trend in the change in the physical quantity detected by the second detection unit satisfying a predetermined condition, wherein:
    the second detecting unit detects a change in a relative position of an object with respect to an operation surface, the object being located in a direction in which the operation surface faces; and the transition unit performs a transition upon an opposite relation being satisfied between a component of the direction of the change detected by the first detection unit, the component being parallel to the operation surface of the portable terminal, and the trend in the change detected by the second detection unit.

9. A program stored on a non-transitory medium, the program causing a computer to execute the steps of:

detecting a change in a position of a portable terminal;

detecting a change in a physical quantity representing a surrounding condition of the portable terminal;

causing the portable terminal to transition from a first state to a second state in which electricity consumption is smaller than that of the first state, upon a relation between a direction of the detected change in the position of the portable terminal and a trend in the detected change in the physical quantity satisfying a predetermined condition;

detecting a change in a relative position of an object with respect to an operation surface, the object being located in a direction in which the operation surface faces; and performing a transition upon an opposite relation being satisfied between a component of the direction of the change detected in the position of the portable terminal, the component being parallel to the operation surface of the portable terminal, and the trend in the change detected in the physical quantity.

* * * * *